US012578812B2

(12) United States Patent
Luo et al.

(10) Patent No.: US 12,578,812 B2
(45) Date of Patent: **\*Mar. 17, 2026**

(54) DISPLAY PANEL AND DISPLAY TOUCH-CONTROL APPARATUS

(71) Applicants: Chengdu BOE Optoelectronics Technology Co., Ltd., Chengdu (CN); BOE Technology Group Co., Ltd., Beijing (CN)

(72) Inventors: Chang Luo, Beijing (CN); Xiping Li, Beijing (CN); Hongwei Ma, Beijing (CN); Ming Hu, Beijing (CN); Wei He, Beijing (CN); Youngyik Ko, Beijing (CN); Haijun Qiu, Beijing (CN); Yi Zhang, Beijing (CN); Taofeng Xie, Beijing (CN); Tianci Chen, Beijing (CN); Qun Ma, Beijing (CN); Xinghua Li, Beijing (CN); Ping Wen, Beijing (CN); Yang Zhou, Beijing (CN); Yuanqi Zhang, Beijing (CN); Xiaoyan Yang, Beijing (CN); Shun Zhang, Beijing (CN); Pandeng Tang, Beijing (CN); Yang Zeng, Beijing (CN); Tong Zhang, Beijing (CN); Xiaofei Hou, Beijing (CN); Zhidong Wang, Beijing (CN); Haoyuan Fan, Beijing (CN); Jinhwan Hwang, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/007,621

(22) Filed: Jan. 2, 2025

(65) Prior Publication Data

US 2025/0130661 A1     Apr. 24, 2025

Related U.S. Application Data

(63) Continuation of application No. 18/281,963, filed as application No. PCT/CN2023/071199 on Jan. 9, 2023, now Pat. No. 12,229,360.

(30) Foreign Application Priority Data

Jan. 29, 2022     (CN) ......................... 202210112870.2

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0445* (2019.05); *G06F 3/0446* (2019.05)

(58) Field of Classification Search
CPC ...... G06F 3/041–047; G06F 2203/041–04114; H10K 59/00–95
See application file for complete search history.

(56) References Cited

U.S. PATENT DOCUMENTS

2022/0075483 A1*  3/2022  Yan ....................... G06F 3/0418
2022/0179513 A1*  6/2022  Kim .................... G06F 3/04164

* cited by examiner

*Primary Examiner* — Sanjiv D. Patel
(74) *Attorney, Agent, or Firm* — Ling Wu; Stephen Yang; Ling and Yang Intellectual Property

(57) ABSTRACT

A display panel, including an active area and a peripheral area, which is located outside of the active area, wherein the active area comprises a base substrate, and a display structure layer and a touch structure layer sequentially arranged on the base substrate; the peripheral area includes an isolation dam, a first ground trace and a second ground trace (Continued)

arranged on the base substrate; and the first ground trace is located at a side of the isolation dam close to the active area, and the second ground trace is located at a side of the isolation dam away from the active area.

20 Claims, 18 Drawing Sheets

3323

3323

DISPLAY PANEL AND DISPLAY TOUCH-CONTROL APPARATUS

CROSS-REFERENCE TO RELATED APPLICATION(S)

This application is a continuation of U.S. patent application Ser. No. 18/281,963 filed on Sep. 14, 2023, which is a national stage application of PCT Application No. PCT/CN2023/071199, which is filed on Jan. 9, 2023 and claims priority of Chinese Patent Application No. 202210112870.2, filed to the CNIPA on Jan. 29, 2022 and entitled "Display Panel and Display Touch-Control Apparatus". The entire contents of the above-identified applications are incorporated herein by reference.

TECHNICAL FIELD

The present disclosure relates to, but is not limited to, the field of touch control technologies, in particular to a display panel and a display touch apparatus.

BACKGROUND

With development of portable electronic display devices, a touch technology provides a new man-machine interaction interface, which is more direct and more humanized in use. The touch technology is integrated with a flat display technology to form a display touch apparatus, such that a flat display apparatus may have a touch function.

SUMMARY

The following is a summary of subject matter described herein in detail. The summary is not intended to limit the protection scope of claims.

Embodiments of the present disclosure provide a display panel and a display touch apparatus.

In one aspect, an embodiment of the present disclosure provides a display panel including: an active area, a peripheral area located at a periphery of the active area. The active area includes a base substrate, a display structure layer and a touch structure layer arranged sequentially on the base substrate. The peripheral area includes an isolation dam, a first ground trace and a second ground trace arranged on the base substrate. The first ground trace is located on a side of the isolation dam close to the active area, and the second ground trace is located on a side of the isolation dam away from the active area.

In some exemplary implementation modes, the peripheral area includes a bonding area located on a side of the active area and an edge area located on the other side of the active area. The bonding area includes at least one ground pin. The first ground trace and the second ground trace are electrically connected to the at least one ground pin of the bonding area.

In some exemplary implementation modes, in the bonding area, the first ground trace and the second ground trace are electrically connected to the same ground pin.

In some exemplary implementation modes, in the bonding area, the first ground trace, the second ground trace and the ground pin are of an integral structure.

In some exemplary implementation modes, a cover plate is provided on a side of the touch structure layer away from the base substrate. The touch structure layer includes: at least one touch conductive layer. The second ground trace and the touch conductive layer closest to the cover plate are of a structure of a same layer.

In some exemplary implementation modes, the second ground trace and the first ground trace are of a structure of a same layer.

In some exemplary implementation modes, the touch structure layer includes: a first touch conductive layer, a first touch insulating layer, a second touch conductive layer, and a second touch insulating layer arranged sequentially on the display structure layer. The first ground trace and the second ground trace are of a structure of a same layer as the second touch conductive layer.

In some exemplary implementation modes, the peripheral area further includes: an auxiliary ground trace. The auxiliary ground trace and the first touch conductive layer are of a structure of a same layer. The auxiliary ground trace is connected to the second ground trace, and an orthographic projection of the auxiliary ground trace on the base substrate partially overlaps an orthographic projection of the second ground trace on the base substrate.

In some exemplary implementation modes, an orthographic projection of the second touch insulating layer on the base substrate partially overlaps an orthographic projection of the second ground trace on the base substrate.

In some exemplary implementation modes, the second ground trace includes a main body and a serrated portion facing a side of the active area.

In some exemplary implementation modes, the second ground trace includes: an outer ring trace and an inner ring trace. The outer ring trace is located on a side of the inner ring trace away from the active area.

In some exemplary implementation modes, the outer ring trace and the inner ring trace are separately grounded.

In some exemplary implementation modes, the inner ring trace is provided with a plurality of apertures arranged in at least one column along the direction of the active area toward the edge area.

In some exemplary implementation modes, the plurality of apertures provided in the inner ring trace are arranged in a column along the direction of the active area toward the edge area, and an orthographic projection of the plurality of apertures on the base substrate does not overlap an orthographic projection of a conductive layer located in the peripheral area and being of a structure of a same layer as the display structure layer on the base substrate.

In some exemplary implementation modes, the second ground trace includes an outer ring trace, an inner ring trace, and a plurality of connection traces connected between the outer ring trace and the inner ring trace; the outer ring trace is located on a side of the inner ring trace away from the active area.

In some exemplary implementation modes, an orthographic projection of at least one of the plurality of connection traces on the base substrate is rectangular.

In some exemplary implementation modes, an orthographic projection of at least one of the plurality of connection traces on the base substrate is S-shaped.

In some exemplary implementation modes, a single connection trace includes a first extension segment and a second extension segment which are connected sequentially, the first extension segment extends in a direction of the active area toward the edge area, the extension direction of the second extension segment intersects the extension direction of the first extension segment. The first extension segment, the second extension segment and the first extension segment which are connected sequentially form a circuity, or the second extension segment, the first extension segment and the second extension segment sequentially connected form a circuity.

In some exemplary implementation modes, the number of circuities of a single connection trace is 3 to 5. The width of the first extension segment and the second extension segment is 3 microns to 5 microns, and the spacing between adjacent extension segments extending in the same direction is 3 microns to 5 microns.

In some exemplary implementation modes, the quantity of the connection traces is less than or equal to 40.

In some exemplary implementation modes, a plurality of transistors are connected between the outer ring trace and the inner ring trace, a first electrode of a single transistor is electrically connected to the inner ring trace, a second electrode of the transistor is electrically connected to the outer ring trace, and a gate electrode of the transistor is electrically connected to a first power supply line.

In some exemplary implementation modes, the transistor is a P-type transistor.

In some exemplary implementation modes, a plurality of tip discharge structures are provided between the outer ring trace and the inner ring trace, and at least one tip discharge structure includes: a first electrode and a second electrode, the first electrode and the outer ring trace are of an integral structure, the second electrode is located between the first electrode and the inner ring trace. The first electrode has a first tip, and the first tip of the first electrode faces the second electrode; there is a gap between the first tip and the second electrode.

In some exemplary implementation modes, the second electrode has a second tip, the second tip of the second electrode faces the first tip of the first electrode, and there is a gap between the first tip and the second tip.

In some exemplary implementation modes, an orthographic projection of the second electrode on the base substrate is rectangular.

In some exemplary implementation modes, a plurality of anti-static capacitors are disposed between the outer ring trace and the inner ring trace, at least one anti-static capacitor includes a first plate and a second plate. The first plate and the outer ring trace are of an integral structure, and the second plate is located at a side of the first plate close to the inner ring trace.

In some exemplary implementation modes, the first plate has a plurality of first comb portions facing the second plate, the second plate has a plurality of second comb portions facing the first plate, the plurality of first comb portions and the plurality of second comb portions interspersed with each other.

In some exemplary implementation modes, a spacing between adjacent first comb portion and second comb portion, a width of the first comb portion and a width of the second comb portion are substantially the same.

In some exemplary implementation modes, the first plate of the anti-static capacitor is grounded and the second plate is a dummy conductive structure.

In some exemplary implementation modes, the first plate and the second plate of the anti-static capacitor are each of a multilayer stacked structure.

In some exemplary implementation modes, orthographic projections the first plate and the second plate of the anti-static capacitor on the base substrate are of a mosaic pattern.

In some exemplary implementation modes, the peripheral area further includes: a crack dam located on a side of the isolation dam away from the active area. The outer ring trace is located on a side of the crack dam away from the active area, and the orthographic projection of the outer ring trace on the base substrate does not overlap the orthographic projection of the crack dam on the base substrate.

In some exemplary implementation modes, the width ratio of the outer ring trace to the inner ring trace is 2.7 to 3.3.

In some exemplary implementation modes, the peripheral area further includes: a plurality of auxiliary electrodes. The plurality of auxiliary electrodes are located on a side of the inner ring trace close to the base substrate, an insulating layer is disposed between the plurality of auxiliary electrodes and the inner ring trace, and an orthographic projection of the inner ring trace on the base substrate covers an orthographic projection of the plurality of auxiliary electrodes on the base substrate.

In some exemplary implementation modes, the inner ring trace is provided with a plurality of apertures, and the orthographic projection of the plurality of auxiliary electrodes on the base substrate are arranged between the orthographic projection of the plurality of apertures on the base substrate.

In some exemplary implementation modes, the plurality of apertures are arranged in a column along the direction of the active area toward the edge area, and an auxiliary electrode is arranged at intervals of two apertures.

In some exemplary implementation modes, the plurality of auxiliary electrodes are dummy conductive structures, and the orthographic projection of the auxiliary electrodes on the base substrate is rectangular.

In some exemplary implementation modes, the length of the auxiliary electrode in a fourth direction is greater than the length of the aperture in the fourth direction, and the length of the auxiliary electrode in a fifth direction is less than the length of the aperture in the fifth direction. Herein, the fourth direction is the direction in which the active area faces the edge area, and the fifth direction intersects with the fourth direction.

In some exemplary implementation modes, the orthographic projection of the outer ring trace on the base substrate does not overlap with the orthographic projection of the second touch insulating layer on the base substrate.

In another aspect, an embodiment of the present disclosure provides a display touch apparatus including the above-mentioned display panel.

Other aspects may be understood upon reading and understanding accompanying drawings and detailed description.

BRIEF DESCRIPTION OF THE DRAWINGS

Accompanying drawings are used to provide an understanding of technical solutions of the present disclosure, form a part of the specification, and are used to explain the technical solutions of the present disclosure together with the embodiments of the present disclosure but are not intended to form limitations on the technical solutions of the present disclosure. Shapes and sizes of one or more components in the drawings do not reflect actual scales, and are only intended to schematically describe contents of the present disclosure.

DETAILED DESCRIPTION

Figure 1A:
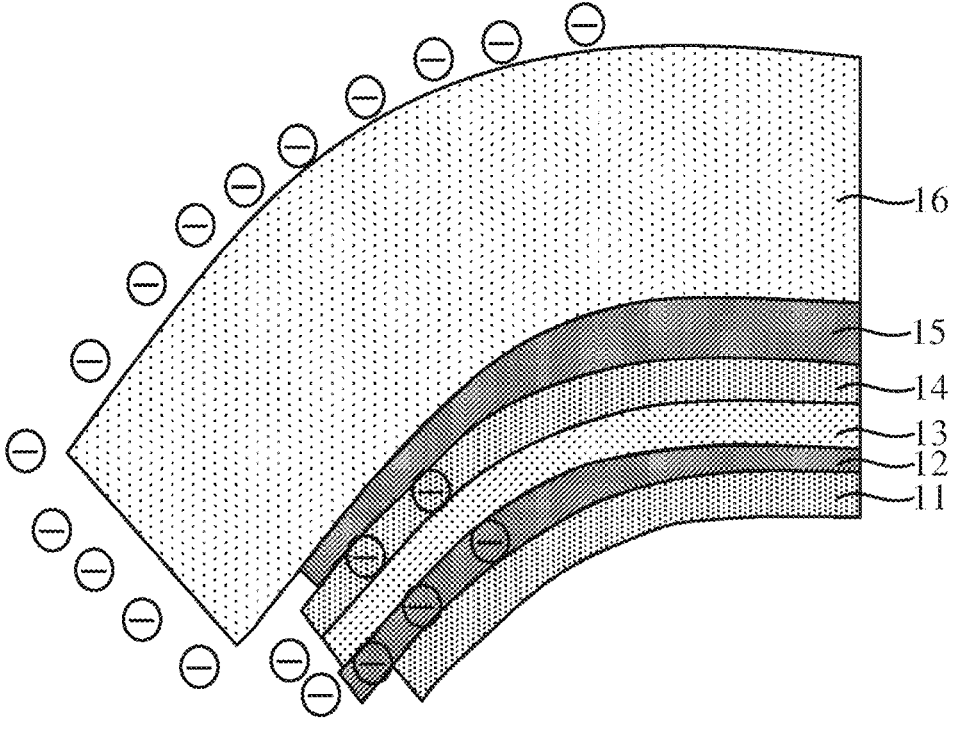
FIG. 1A is a schematic diagram showing conduction of negative charges generated by friction on a surface of a cover plate of a display panel.

The embodiments of the present disclosure will be described below with reference to the drawings in detail. Implementation modes may be implemented in a plurality of different forms. Those of ordinary skills in the art may easily understand such a fact that modes and contents may be transformed into one or more forms without departing from the purpose and scope of the present disclosure. Therefore, the present disclosure should not be explained as being limited to contents described in following implementation modes only. The embodiments in the present disclosure and features in the embodiments may be combined randomly with each other if there is no conflict.

In the drawings, a size of one or more constituent elements, a thickness of a layer, or an area is sometimes exaggerated for clarity. Therefore, one mode of the present disclosure is not necessarily limited to the size, and shapes and sizes of various components in the drawings do not reflect actual scales. In addition, the drawings schematically illustrate ideal examples, and one mode of the present disclosure is not limited to shapes, numerical values, or the like shown in the drawings.

Ordinal numerals such as "first", "second" and "third" in the present disclosure are set to avoid confusion between constituent elements, but not intended for restriction in quantity. In the present disclosure, "plurality" represents two or more than two.

In the present disclosure, for convenience, wordings "central", "up", "down", "front", "rear", "vertical", "horizontal", "top", "bottom", "inside", "outside" and the like indicating orientation or positional relationships are used to illustrate positional relationships between constituent elements with reference to the drawings, which are only used to facilitate describing the present specification and simplify the description, rather than indicating or implying that involved devices or elements must have specific orientations and be structured and operated in the specific orientations, and thus should not be understood as limitations on the present disclosure. The positional relationships between the constituent elements are changed as appropriate according to directions for describing the constituent elements. Therefore, appropriate replacements may be made according to situations without being limited to the wordings described in the specification.

In the present disclosure, unless otherwise specified and defined, terms "mounting", "mutual connection" and "connection" should be understood in a broad sense. For example, a connection may be a fixed connection, a detachable connection, or an integrated connection; it may be a mechanical connection or an electrical connection; it may be a direct mutual connection, or an indirect connection through middleware, or internal communication between two elements. Those of ordinary skills in the art may understand meanings of the above-mentioned terms in the present disclosure according to situations. An "electrical connection" includes a case where constituent elements are connected together through an element with a certain electrical action. The "element having some electrical function" is not particularly limited as long as electrical signals between the connected constituent elements may be transmitted. Examples of the "element with the certain electrical effect" not only include electrodes and wirings, but also include switching elements such as transistors, resistors, inductors, capacitors, other elements with one or more functions, etc.

In the present disclosure, a transistor refers to an element including at least three terminals, namely, a gate electrode, a drain electrode and a source electrode. The transistor has a channel area between the drain electrode (drain electrode terminal, drain area, or drain) and the source electrode (source electrode terminal, source area, or source), and a current can flow through the drain electrode, the channel area, and the source electrode. In the present disclosure, the channel area refers to an area which the current flows mainly through.

In the present disclosure, to distinguish two electrodes of a transistor except the gate electrode, one of the electrodes is referred to as a first electrode and the other electrode is referred to as a second electrode. The first electrode may be a source electrode or a drain electrode, and the second electrode may be a drain electrode or a source electrode. In addition, the gate electrode of the transistor is referred to as a control electrode. In a case that transistors with opposite polarities are used, in a case that a direction of a current is changed during operation of a circuit, or the like, functions of the "source electrode" and the "drain electrode" are sometimes interchangeable. Therefore, the "source electrode" and the "drain electrode" may be interchangeable in the present disclosure.

In the present disclosure, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is above 80° and below 100°, and thus also includes a state in which the angle is above 85° and below 95°.

In the present disclosure, "film" and "layer" are interchangeable. For example, a "conductive layer" may be replaced with a "conductive film" sometimes. Similarly, an "insulation film" may be replaced with an "insulating layer" sometimes.

In the present disclosure, "about" and "substantially" refer to that a boundary is not defined strictly and a case within a range of a process and measurement error is allowed.

In the present disclosure, "width" means a length in a direction perpendicular an extension direction of a trace in a plane of extension of the trace.

A display panel according to an embodiment of the present disclosure may be integrated with a touch structure. The display panel may include an organic light emitting diode (OLED) display substrate, or may be a Quantum Dot Light Emitting Diodes (QLED) display substrate, or may be a plasma display panel (PDP) display substrate, or may be an electrophoretic display (EPD) display substrate, or may be a liquid crystal display (LCD) substrate. In some examples, the display panel may include an OLED display substrate, and the OLED display substrate may include a base substrate, a drive circuit layer disposed on the base substrate, a light emitting element layer disposed on the drive circuit layer, and an encapsulation layer disposed on the light emitting element layer. The touch structure is disposed on the encapsulation layer of the display substrate to form a structure of Touch on Thin Film Encapsulation (Touch on TFE for short), a display structure and the touch structure are integrated together, which has advantages of being light and thin, and foldable, and may meet requirements of products such as flexible folding and narrow borders.

Structures of Touch on TFE mainly include a Flexible Multi-Layer On Cell (FMLOC for short) structure and a Flexible Single-Layer On Cell (FSLOC for short) structure. The FMLOC structure is based on a working principle of mutual capacitance detection, wherein a driving (Tx) electrode and a sensing (Rx) electrode are generally formed by using two layers of metal, and an Integrated Circuit (IC) achieves a touch action by detecting mutual capacitance between the driving electrode and the sensing electrode. The FSLOC structure is based on a working principle of self-capacitance (or voltage) detection, wherein a touch electrode is generally formed by using a single layer of metal, and an integrated circuit achieves a touch action by detecting self-capacitance (or voltage) of the touch electrode.

Figure 1B:
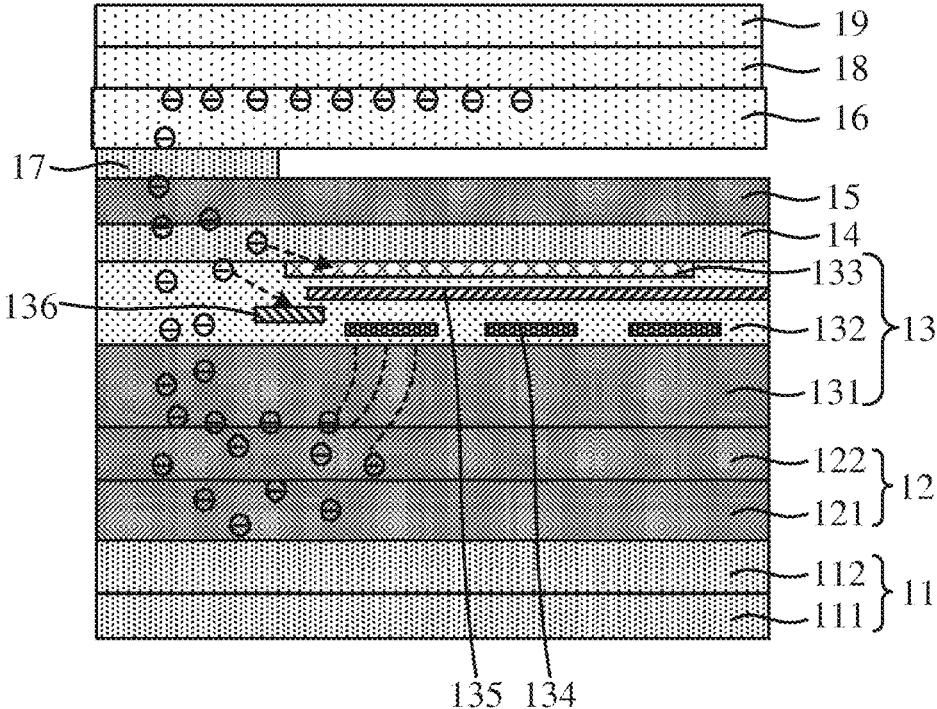
FIG. 1B is a schematic diagram of a negative electric field in a display panel formed by negative charges generated by friction on a surface of a cover plate.

FIG. 1A is a schematic diagram showing conduction of negative charges generated by friction on a surface of a cover plate of a display panel. FIG. 1B is a schematic diagram of a negative electric field in a display panel formed by negative charges generated by friction on a surface of a cover plate. Each of FIG. 1A and FIG. 1B show a cross-sectional structure of a display panel.

As shown in FIG. 1A and FIG. 1B, the display panel may include a heat dissipation film layer (SCF) 11, a carrier film layer (U-film) 12, a display touch substrate 13, a Polarizer (POL for short) 14, an Optically Clear Adhesive (OCA for short) layer 15, a cover plate (CG) 16, an insulating layer 18, and a high-permeability fingerprint-proof film (AF) 19 which are arranged sequentially. The cover plate 16 may be a glass cover plate. The material of the insulating layer 18 may be silicon dioxide ($SiO_2$). The heat dissipation film layer 11 may include a conductive heat dissipation layer 111 and a non-conductive heat dissipation layer 112 which are stacked sequentially. The carrier film layer 12 may include a first carrier layer 121 and a second carrier layer 122 which are stacked sequentially. For example, a material of the first carrier layer 121 may be polyethylene terephthalate (PET), and a material of the second carrier layer 122 may be Pressure Sensitive Adhesive (PSA for short). The display touch substrate 13 may include a base substrate 131, a display structure layer 132 and a touch structure layer 133 which are arranged sequentially. The display structure layer 132 may include a drive circuit layer (e.g. including a plurality of pixel circuits) and a light emitting element layer (e.g. including a plurality of light emitting elements). The pixel circuit is electrically connected with the light emitting element, and is configured to drive the light emitting element to emit light. The drive circuit layer may at least include a semiconductor layer 134 (e.g. an active layer including a transistor), a power supply trace 135 (e.g. a low-voltage line VSS), and a signal trace 136. Ink 17 is coated between the cover plate 16 and the optical adhesive layer 15 in a bezel area of the display panel.

As shown in FIG. 1A and FIG. 1B, a large number of negative charges are generated when a user's finger (corresponding to a metal rod) is rubbed against a surface of the cover plate 16. Since charges of a same polarity repel each other, negative charges will diffuse, since most of the material of the film layer the display panel is a high-resistance material, static electricity is more easily conducted up and down (i.e. conducted along a vertical cross-sectional direction) than conducted transversely (i.e. conducted along a horizontal plane direction), and therefore static electricity accumulates on the surface of the cover plate 16 and then conducts to a lower layer, since a metal film layer of the display structure layer 132 (for example, the power supply trace 135 and the signal trace 136) and a metal film layer of the touch structure layer 133 of the display touch substrate 13 may lead out static electricity, most of the static electricity is more likely to be transmitted sequentially to the lower layer from a position at an edge of the display panel where there is no metal layer. As shown in FIG. 1B, the cover plate 16, the optical adhesive layer 15, the polarizer 14, the display touch substrate 13, and the second carrier layer 122 of the carrier film layer 12 all have high conductivity against negative charges, the ink 17 and the non-conductive heat dissipation layer 112 of the heat dissipation film layer 11 have medium conductivity against negative charges, and the first carrier layer 121 of the carrier film layer 12 has low conductivity against negative charges. Therefore, the negative charges generated on the surface of the cover plate 16 is transferred from the edge of the display panel to the lower layer, passes through the optical adhesive layer 15, the polarizer 14, an insulating layer of the display touch substrate 13, and the base substrate 131 sequentially, and accumulates on a side of the base substrate 131 of the display touch substrate 13 away from the cover plate 16 (i.e., the back surface) to form a negative electric field. The negative electric field formed on the display touch substrate 13 causes a threshold voltage (Vth) of the transistor of the drive circuit layer to be biased forward, thereby making the display touch substrate 13 be illuminated. For example, since the green sub-pixel is sensitive to start, the display panel often shows poor display with greenish screen.

The present embodiment provides a display panel, which includes an active area and a peripheral area located at a periphery of the active area. The active area includes a base substrate, and a display structure layer and a touch structure layer arranged sequentially on the base substrate. The peripheral area includes an isolation dam, a first ground trace and a second ground trace provided on the base substrate. The first ground trace is located on a side of the isolation dam close to the active area, and the second ground trace is located on a side of the isolation dam away from the active area.

In the display panel according to the embodiment, the negative charges generated on the surface of the cover plate may be led out by arrangement of the second ground trace in the peripheral area, thereby blocking an electrostatic conduction path, reducing the negative electric field formed inside the display panel, and improving the illumination of the display structure layer caused by the negative electric field.

In some exemplary implementation modes, the peripheral area may include a bonding area located on a side of the active area and an edge area located on the other side of the active area. The bonding area includes at least one ground pin. The first ground trace and the second ground trace are electrically connected to at least one ground pin of the bonding area. In some examples, the first ground trace and the second ground trace may be electrically connected to a same ground pin in the bonding area. For example, in the bonding area, the first ground trace, the second ground trace and the ground pin are of an integral structure. In the present example, the first ground trace and the second ground trace are not electrically connected in the edge area and can be electrically connected in the bonding area. However, this embodiment is not limited thereto. For example, there may be no electrical connection between the first ground trace and the second ground trace.

In some exemplary implementation modes, a cover plate is provided on a side of the touch structure layer away from the base substrate. The touch structure layer includes at least one touch conductive layer. The second ground trace and the touch conductive layer closest to the cover plate are of a structure of a same layer. In some examples, the display panel may be of an FSLOC structure, the touch structure layer includes one touch conductive layer, and the second ground trace is of a structure of a same layer as the touch conductive layer; alternatively, the display panel may have an FMLOC structure, the touch structure layer includes two touch conductive layers, and the second ground trace may be of a structure of a same layer as the touch conductive layer close to the cover plate. However, this embodiment is not limited thereto. In this example, by setting the second ground trace and the touch conductive layer closest to the cover plate to be of a structure of a same layer, the induced charges generated by friction on a surface of the cover plate can be effectively led out.

In some exemplary implementation modes, the second ground trace and the first ground trace may be of a structure of a same layer. For example, the first ground trace and the second ground trace may be of a structure of a same layer as one of the touch conductive layers of the touch structure layer. However, this embodiment is not limited thereto. For example, the first ground trace and the second ground trace may be of structures of different layers. For example, the second ground trace may be located on a side of the first ground trace close to the base substrate.

In some exemplary implementation modes, the touch structure layer may include a first touch conductive layer, a first touch insulating layer, a second touch conductive layer, and a second touch insulating layer arranged sequentially on the display structure layer. The first ground trace and the second ground trace are of a structure of a same layer as the second touch conductive layer. However, this embodiment is not limited thereto. For example, the second ground trace and the second touch conductive layer are of a structure of a same layer, and the first ground trace and the first touch conductive layer are of a structure of a same layer. Optionally, the first ground trace and the second touch conductive layer are of a structure of a same layer, and the second ground trace and the first touch conductive layer are of a structure of a same layer.

In some exemplary implementation modes, the peripheral area may also include an auxiliary ground trace. The auxiliary ground trace and the first touch conductive layer are of a structure of a same layer. The auxiliary ground trace is connected with the second ground trace. The orthographic projection of the auxiliary ground trace on the base substrate partially overlaps the orthographic projection of the second ground trace on the base substrate. In this example, by arranging the auxiliary ground trace on a side of the second ground trace close to the base substrate, the conduction of static electricity from the cover plate to a side of the base substrate can be more effectively blocked.

In some exemplary implementation modes, the orthographic projection of the second touch insulating layer on the base substrate partially overlaps the orthographic projection of the second ground trace on the base substrate. The orthographic projection of the first touch insulating layer on the base substrate and the orthographic projection of the second ground trace on the base substrate may not overlap or partially overlap. However, this embodiment is not limited thereto.

In some exemplary implementation modes, the second ground trace may include a main body and a serrated portion facing a side of the active area. That is, the side of the second ground trace facing the active area is serrated. This example can reduce the contact area between the second ground trace and the second touch insulating layer, thereby avoiding peeling of the film layer.

In some exemplary implementation modes, the second ground trace may include an outer ring trace and an inner ring trace. The outer ring trace is located on a side of the inner ring trace away from the active area. The outer ring trace and the inner ring trace are grounded separately. In this example, there is no electrical connection between the inner ring trace and the outer ring trace, by setting the inner ring trace and the outer ring trace separately grounded, the inner ring trace can be used to lead out the induced charges generated inside the display panel, and the outer ring trace can be used to intercept the static electricity introduced from the outside, such as the static electricity introduced when the display panel is tested for Electrostatic Discharge (ESD). The inner ring trace and the outer ring trace in this example can separate the internal induced charges and the external static charges and release them in different paths, thereby improving the performance of the display panel.

In some exemplary implementation modes, the inner ring trace may be provided with a plurality of apertures arranged in at least one column in a direction of the active area toward the edge area. For example, the plurality of apertures provided in the inner ring trace are arranged in only one column along the direction of the active area towards the edge area, and the orthographic projection of the plurality of apertures on the base substrate and the orthographic projection of the conductive layer located in the peripheral area and being of a structure of a same layer as the display structure layer on the base substrate may not overlap. This example can reduce the large area contact between the second ground trace and the second touch insulating layer by providing apertures in the inner ring trace, thereby avoiding peeling of the film layer. Moreover, the orthographic projection of the apertures on the base substrate may not overlap the orthographic projection of the other conductive layers on the base substrate, thereby avoiding the influence of electrostatic conduction downward through the apertures on the other conductive layers. However, this embodiment is not limited thereto. For example, the plurality of apertures may be arranged in two or more columns along a side of the active area toward the edge area.

In some exemplary implementation modes, the second ground trace may include an outer ring trace, an inner ring trace, and a plurality of connection traces connected between the outer ring trace and the inner ring trace. The outer ring trace is located on a side of the inner ring trace away from the active area. In some examples, the orthographic projection of at least one connection trace on the base substrate is rectangular. Alternatively, in some examples, the orthographic projection of at least one connection trace on the base substrate is S-shaped. In this example, by providing an S-shaped connection trace, the resistance of the second ground trace can be increased, thus preventing static electricity breakdown in the adapter hole, thereby providing protection. However, this embodiment is not limited thereto.

In some exemplary implementation modes, the quantity of connection traces may be less than or equal to 40. For example, the quantity of connection traces can be 6, 19, or 40. However, this embodiment is not limited thereto.

In some exemplary implementation modes, a plurality of tip discharge structures are disposed between the outer ring trace and the inner ring trace. At least one tip discharge structure includes a first electrode and a second electrode. The first electrode and the outer ring trace are of an integral structure, and the second electrode is located between the first electrode and the inner ring trace. The first electrode has a first tip; the first tip of the first electrode faces the second electrode, and there is a gap between the first tip and the second electrode. In some examples, the second electrode has a second tip; the second tip of the second electrode faces the first tip of the first electrode, and there is a gap between the first tip and the second tip. Alternatively, in some examples, the orthographic projection of the second electrode on the base substrate may be rectangular. However, this embodiment is not limited thereto. In this example, by providing a plurality of tip discharge structures, an electrostatic absorption circuit can be added to prevent static electricity from being concentrated and discharged, thus providing protection for the display panel.

In some exemplary implementation modes, a plurality of anti-static capacitors are disposed between the outer ring trace and the inner ring trace, and at least one anti-static capacitor includes a first plate and a second plate. The first plate and the outer ring trace are of an integral structure, and the second plate is located on a side of the first plate close to the inner ring trace. In some examples, the first plate of the anti-static capacitor is grounded and the second plate is a dummy conductive structure. In some examples, the first plate and the second plate of the anti-static capacitor may be in a multilayer stacked structure, and the capacitance is increased by increasing the thickness of the plate. In some examples, the first plate has a plurality of first comb portions facing the second plate, and the second plate has a plurality of second comb portions facing the first plate. The plurality of first comb portions and the plurality of second comb portions are interspersed with each other. In this way, the capacitance can be increased by increasing the overlapping area between the two plates. In this example, by providing the anti-static capacitor, the anti-static capacitor can be charged during transient high-voltage static electricity access, which acts as a voltage divider and provides protection for the display panel.

In some exemplary implementation modes, a plurality of transistors are connected between the outer ring trace and the inner ring trace. A first electrode of single transistor is electrically connected to the inner ring trace, a second electrode of the transistor is electrically connected to the outer ring trace, and a gate electrode of the transistor is electrically connected to a first power supply line. In some examples, the transistor may be a P-type transistor. In this example, the transistor can effectively lead out the induced charges generated inside the display panel through the inner ring trace to the outer ring trace, and can block the external static charge from entering the inside from the outside.

In some exemplary implementation modes, the peripheral area may also include a plurality of auxiliary electrodes. The plurality of auxiliary electrodes are located on a side of the inner ring trace close to the base substrate. An insulating layer is arranged between the plurality of auxiliary electrodes and the inner ring trace, and the orthographic projection of the inner ring trace on the base substrate covers the orthographic projection of the plurality of auxiliary electrodes on the base substrate. In this example, by providing the auxiliary electrodes, a protection capacitor can be formed between the inner ring trace and the auxiliary electrode, thereby providing a release path of the internal induced charge.

The display panel according to the present embodiment will be illustrated by some examples below.

Figure 2:
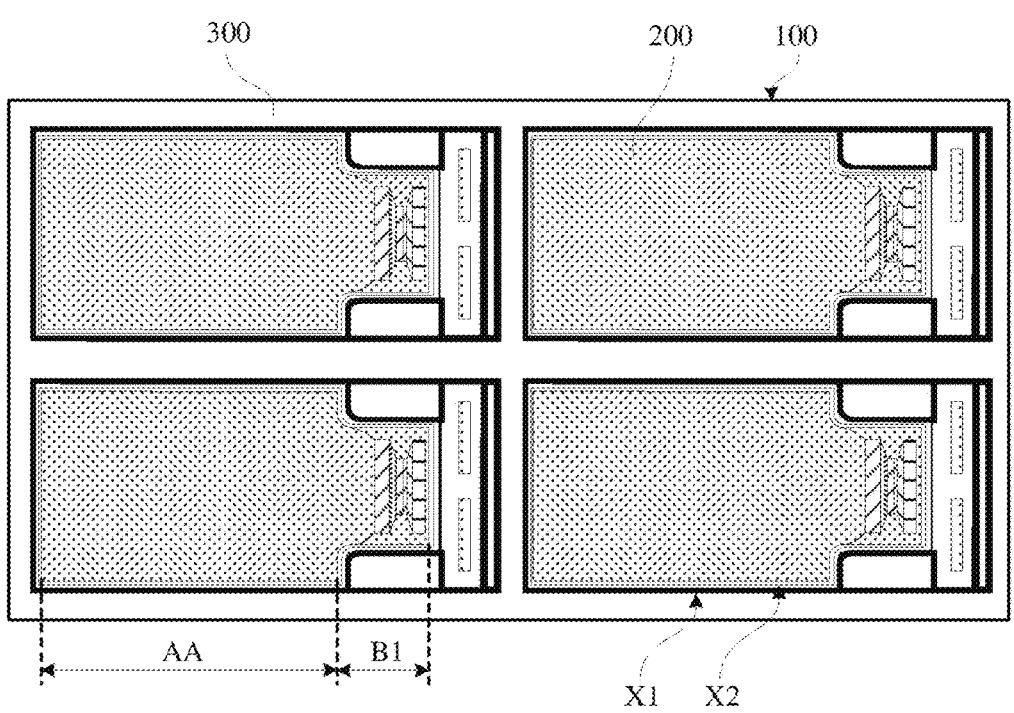
FIG. 2 is a schematic diagram of an arrangement of a display motherboard including a plurality of display touch substrates.

In some exemplary implementation modes, a flexible display panel is illustrated as an example. In a preparation process of the flexible display panel, a display motherboard is prepared firstly, and then the display motherboard is cut, so that the display motherboard is divided into a plurality of display touch substrates, and the separated display touch substrates may be used to form a single display panel. FIG. 2 is a schematic diagram of an arrangement of a plurality of display touch substrates included on a display motherboard. As shown in FIG. 2, multiple substrate areas 200 on the display mother plate 100 are periodically and regularly arranged, and a cutting area 300 is located outside the base substrate areas 200. Each substrate area 200 at least includes an active area AA and a bonding area B1 located on at least a side of the active area AA. For example, the active area AA may include a plurality of sub-pixels arranged regularly and the bonding area B1 may include a fan-out area and bonding pins. A first cutting path X1 and a second cutting path X2 are provided in the cutting area 300. After all the film layers of the display motherboard are prepared, a cutting equipment performs rough cutting and fine cutting along the first cutting path X1 and the second cutting path X2 to form a display touch substrate.

Figure 3:
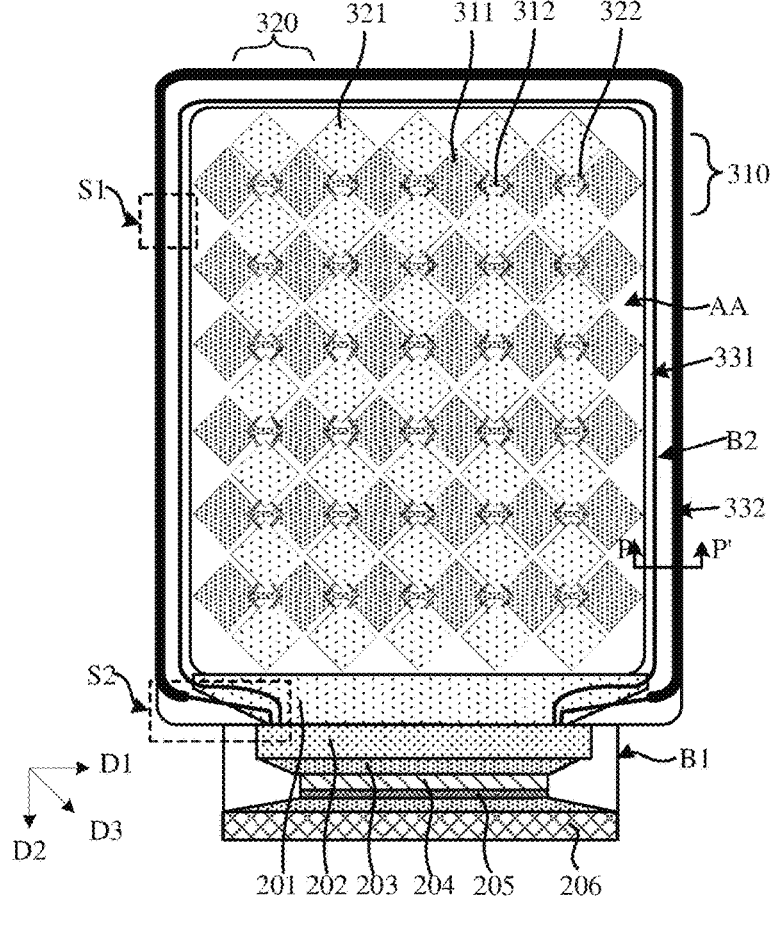
FIG. 3 is a schematic diagram of a display panel according to at least one embodiment of the present disclosure.

FIG. 3 is a schematic diagram of a display panel according to at least one embodiment of the present disclosure. The display panel of this example is illustrated by taking an FMLOC structure as an example. However, this embodiment is not limited thereto. In some other examples, the display panel may be of an FSLOC structure and has a single touch conductive layer with which both the first ground trace and the second ground trace may be of a structure of a same layer.

In some exemplary implementation modes, as shown in FIG. 3, in a plane parallel to the display panel, the display panel may include an active area AA, and a peripheral area located at a periphery of the active area AA. The peripheral area may include a bonding area B1 located on a side of the active area AA and an edge area B2 located on the other side of the active area AA. For the stacked display substrate and touch structure, the active area AA may be either a touch area or a display area, and both the touch area and the display area in the following description refer to active areas AA.

In some exemplary implementation modes, as shown in FIG. 3, the touch area may at least include a plurality of touch electrodes arranged regularly, the edge area B2 at least includes a plurality of touch leads, the first ground trace 331 and the second ground trace 332, and the bonding area B1 includes at least pins connecting the plurality of touch leads, the first ground trace 331 and the second ground trace 332 to an external control apparatus.

In an exemplary embodiment, the touch structure may have a mutual capacitance structure. As shown in FIG. 3, the touch area may include a plurality of first touch units 310 and a plurality of second touch units 320. The first touch units 310 have a linear shape extending along a first direction D1 and the plurality of first touch units 310 are arranged sequentially along a second direction D2. The second touch units 320 have a linear shape extending along the second direction D2 and the plurality of second touch units 320 are arranged sequentially along the first direction D1. The first direction D1 intersects with the second direction D2, for example, the first direction D1 is perpendicular to the second direction D2. Each first touch unit 310 may include a plurality of first touch electrodes 311 and first connection portions 312 which are arranged sequentially along the first direction D1, and the first touch electrodes 311 and the first connection portion 312 are alternately arranged and electrically connected sequentially. Each second touch unit 320 may include a plurality of second touch electrodes 321 arranged sequentially along the second direction D2, and the plurality of second touch electrodes 321 are arranged at intervals. Adjacent second touch electrodes 321 are electrically connected to each other by a second connection portion 322. In some examples, film layers where the second connecting portions 322 are located are different from film layers where the first touch electrodes 311 and the second touch electrodes 321 are located. The first touch electrodes 311 and the second touch electrodes 321 are alternately arranged along a third direction D3, and the third direction D3 intersects with both the first direction D1 and the second direction D2.

In some exemplary implementation modes, the multiple first touch electrodes 311, the multiple second touch electrodes 321, and the multiple first connecting portions 312 may be disposed on a same layer, i.e., a touch layer, and may be formed through a same patterning process, and the first touch electrodes 311 and the first connecting portions 312 may be connected with each other to be of an integral structure. The second connection portions 322 may be arranged on a bridging layer, and adjacent second touch electrodes 321 are electrically connected to each other through a via. A touch insulating layer is arranged between the touch layer and the bridging layer. In some possible implementations, the plurality of first touch electrodes 311, the plurality of second touch electrodes 321 and the plurality of second connection portions 322 may be arranged on a same layer, i.e., the touch layer, and the second touch electrodes 321 and the second connection portions 322 may be connected to each other in an integral structure. The first connection portions 312 may be arranged on the bridging layer and adjacent first touch electrodes 311 are electrically connected to each other through vias. In some examples, the first touch control electrodes may be drive (Tx) electrodes and the second touch control electrodes may be sensing (Rx) electrodes. Or, the first touch control electrodes may be sensing (Rx) electrodes and the second touch control electrodes may be drive (Tx) electrodes. However, this embodiment is not limited thereto.

In some exemplary implementation modes, the first touch electrodes 311 and the second touch electrodes 321 may have rhombus shapes, such as regular rhombus shapes, horizontally longer rhombus shapes, or longitudinally longer rhombus shapes. In some possible implementations, the first touch electrode 311 and the second touch electrode 321 may have any one or more of shapes of triangles, squares, trapezoids, parallelograms, pentagons, hexagons, and other polygons, which are not limited in the present disclosure.

In some exemplary implementation modes, the first touch electrodes 311 and the second touch electrodes 321 may be in a form of transparent conductive electrodes. In some other exemplary implementation modes, the first touch electrodes 311 and the second touch electrodes 321 may be in a form of a metal mesh. The metal mesh is formed by a plurality of interweaving metal wires and includes a plurality of mesh patterns, wherein a mesh pattern is a polygon formed by a plurality of metal wires. The first touch electrodes 311 and the second touch electrodes 321 in the form of the metal mesh have advantages of small resistance, small thickness, fast response speed, and the like.

In some exemplary implementation modes, as shown in FIG. 3, the bonding area B1 is located on a side of the touch area AA, and in a direction away from the touch area AA (e.g., the second direction D2), the bonding area B1 may include a first fan-out area 201, a bending area 202, a second fan-out area 203, an anti-static area 204, a drive chip area 205, and a bonding pin area 206 arranged sequentially. The first fan-out area 201 may be provided with signal transmission lines and touch leads of the display substrate. The signal transmission lines of the display substrate may at least include a high-voltage line VDD, a low-voltage line VSS and a plurality of data transmission lines. The plurality of data transmission lines are configured to be connected to data lines of the display area in a fan-out tracing manner, and the high-voltage line VDD and the low-voltage line VSS are configured to be connected to a high-level power line and a low-level power line of the display substrate respectively. The plurality of touch leads are configured to be correspondingly connected to a plurality of pins of the bonding pin area 206. The bending area 202 may be provided with a groove configured to make the second fan-out area 203, the anti-static area 204, the drive chip area 205 and the bonding pin area 206 bend to the back of the touch area AA. The second fan-out area 203 may be provided with multiple touch leads and multiple data transmission lines which are led out in a fan-out manner. An anti-static circuit may be provided in the anti-static area 204. The anti-static circuit is configured to eliminate static electricity. A source drive circuit (Driver IC) may be provided in the drive chip area 205. The source drive circuit is configured to be electrically connected to the plurality of data transmission lines in the second fan-out area 203. In some possible implementations, the driver chip area 205 may be provided with a Touch and Display Driver Integration (TDDI for short) circuit. The bonding pin area 206 may be provided with a plurality of pins, which are correspondingly electrically connected to the plurality of touch leads and a plurality of signal transmission lines of the source drive circuit, and are connected to an external control device through a flexible printed circuit board (FPC) bound thereto.

In some exemplary implementation modes, as shown in FIG. 3, the edge area B2 is located on several sides of the active area AA away from the bonding area B1. For example, the bonding area B1 is located on a lower side of the active area AA, and the edge area B2 is located on an upper side, a left side and a right side of the active area AA. The edge area B2 is provided with at least a first ground trace 331, a second ground trace 332 and a plurality of touch leads. The second ground trace 332 is located on a side of the first ground trace 331 away from the active area AA. The first ground trace 331 and the second ground trace 332 extend from the edge area B2 to the bonding area B1 and are electrically connected to the ground pin in the bonding pin area 206 of the bonding area B1. For example, the first ground trace 331 and the second ground trace 332 may be electrically connected to the same ground pin in the bonding pin area 206 of the bonding area B1. However, this embodiment is not limited thereto. In this example, there is no electrical connection between the first ground trace 331 and the second ground trace 332 in the edge area B2, and the first ground trace 331 and the second ground trace 332 may be electrically connected in the bonding area B1.

In some exemplary implementation modes, the plurality of touch leads may include a plurality of drive leads and a plurality of sensing leads. Taking the first touch electrodes being drive electrodes and the second touch electrodes being sensing electrodes as an example, first ends of the drive leads are electrically connected to the first touch electrodes respectively, and second ends of the drive leads extends to the bonding area B1 along the edge area B2. First ends of the sensing leads are electrically connected to second touch control electrodes, and second ends of the sensing leads extend along the edge area B2 to the bonding area B1. However, this embodiment is not limited thereto.

In some exemplary implementation modes, the outer sides of the bonding area B1 and the edge area B2 are provided with a first cutting line and a second cutting line. The second cutting line is a fine cutting line located at a periphery of the bonding area B1 and the edge area B2, and a shape of the second cutting line is the same as outer contours of the bonding area B1 and the edge area B2. The first cutting line is a rough cutting line and is located at a periphery of the second cutting line, and a shape of the first cutting line may be substantially the same as a contour of the second cutting line. In this example, the edge of the second ground trace 332 away from the active area AA may be obtained by the second cut line. However, this embodiment is not limited thereto.

Figure 4:
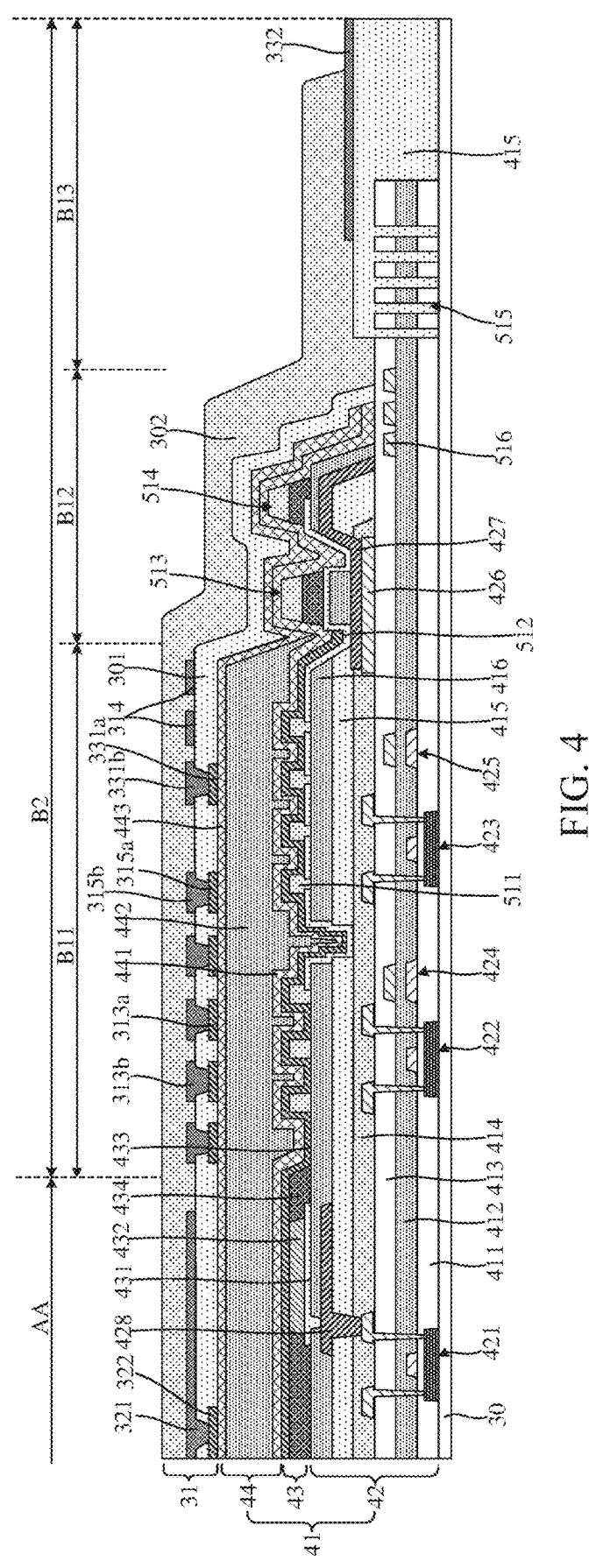
FIG. 4 is a partial cross-sectional view along direction P-P' in FIG. 3.

FIG. 4 is a partial cross-sectional view along direction P-P' in FIG. 3. In some exemplary implementation modes, as shown in FIG. 3 and FIG. 4, in a direction perpendicular to the display panel, the display panel of the active area AA may include a base substrate 30, a display structure layer 41 and a touch structure layer 31 that are arranged sequentially on the base substrate 30. The display structure layer 41 may include a drive circuit layer 42, a light emitting structure layer 43 and an encapsulation layer 44 that are arranged sequentially on the base substrate 30. The touch structure layer 31 takes the encapsulation layer 44 as a base substrate. In some possible implementations, the display structure layer may include other film layers and other film layers may also be disposed between the touch control structure layer and the encapsulation layer, to which this disclosure does not provide any limit.

In some exemplary implementation modes, the base substrate 30 may include a first flexible material layer, a first inorganic material layer, a semiconductor layer, a second flexible material layer, and a second inorganic material layer stacked, materials of the first flexible material layer and the second flexible material layer may be Polyimide (PI), Polyethylene Terephthalate (PET), or a polymer soft film after a surface treatment, etc.; materials of the first inorganic material layer and the second inorganic material layer may be Silicon Nitride (SiNx) or Silicon Oxide (SiOx), etc., for improving capabilities of water-resistance and oxygen-resistance of the base substrate; and a material of the semiconductor layer may be amorphous silicon (a-Si). However, this embodiment is not limited thereto.

In some exemplary implementation modes, the drive circuit layer 42 of the active area AA may include transistors and storage capacitors constituting a pixel circuit. FIG. 4 illustrates one transistor (e.g. a first transistor 421) of a pixel circuit of one sub-pixel of the active area AA as an example. In some examples, as shown in FIG. 4, the drive circuit layer 42 of the active area AA may include a semiconductor layer, a first insulating layer 411, a first gate metal layer, a second insulating layer 412, a second gate metal layer, a third insulating layer 413, a first source-drain metal layer, a fourth insulating layer 414, a first planarization layer 415, a second source-drain metal layer, and a second planarization layer 416 which are arranged sequentially on the base substrate 30. In some examples, the semiconductor layer at least includes an active layer of the first transistor 421. The first gate metal layer at least includes a gate electrode of the first transistor 421, and a first capacitor plate of a capacitor of the pixel circuit. The second gate metal layer at least includes a second capacitor plate of a capacitor of the pixel circuit. The first source-drain metal layer at least includes a first electrode and a second electrode of the first transistor 421. The second source-drain metal layer at least includes an anode connection electrode 428, and the anode connection electrode 428 is configured to be connected to an anode of the light emitting element and the pixel circuit.

In some exemplary implementation modes, the first insulating layer 411, the second insulating layer 412, the third insulating layer 413, and the fourth insulating layer 414 may be inorganic insulating layers, and first planarization layer 415 and the second planarization layer 416 may be organic insulating layers. For examples, the first insulating layer 411, the second insulating layer 412, the third insulating layer 413, and the fourth insulating layer 414 may be made of any one or more of Silicon Oxide (SiOx), Silicon Nitride (SiNx), and Silicon Oxynitride (SiON), and may be a single layer, a multi-layer, or a composite layer, among them, the first insulating layer 411 and the second insulating layer 412 may be referred to as Gate Insulation (GI) layers, the third insulating layer 413 may be referred to as an Interlayer Dielectric (ILD) layer, and the fourth insulating layer 414 may be referred to as a passivation (PVX) layer. The first gate metal layer, the second gate metal layer, the first source-drain metal layer, and the second source-drain metal layer may be made of a metal material, such as any one or more of silver (Ag), copper (Cu), aluminum (Al), titanium (Ti), and molybdenum (Mo), or an alloy material of the above metals, such as an Aluminum Neodymium (AlNd) alloy or a Molybdenum Niobium (MoNb) alloy, and may be in a single-layer structure or a multi-layer composite structure, such as Ti/Al/Ti. The semiconductor layer may be made of a material, such as an amorphous indium gallium zinc oxide material (a-IGZO), zinc oxynitride (ZnON), indium zinc tin oxide (IZTO), amorphous silicon (a-Si), polycrystalline silicon (p-Si), sexithiophene or polythiophene, that is, the present disclosure is applicable to transistors manufactured based on oxide technology, silicon technology or organic technology.

In some exemplary implementation modes, as shown in FIG. 4, the light emitting structure layer 43 of the active area AA may include an anode 431, a pixel definition layer 434, an organic light emitting layer 432, and a cathode 433. The anode 431 is arranged on the second planarization layer 416, and is electrically connected to an anode connection electrode 428 through a via formed in the second planarization layer 416. The pixel definition layer 434 is arranged on the anode 431 and the second planarization layer 416, on which a pixel opening is formed, and the pixel opening exposes the anode 431. The organic light emitting layer 432 is arranged within the pixel opening, and the cathode 433 is arranged on the organic light emitting layer 432, wherein the organic light emitting layer 432 emits light with corresponding colors under the action of voltages applied by the anode 431 and the cathode 433. In some examples, the pixel definition layer 434 may be made of a material such as polyimide, acrylic, or polyethylene terephthalate.

In some exemplary implementation modes, as shown in FIG. 4, the encapsulation layer 44 of the active area AA may include a first encapsulation layer 441, a second encapsulation layer 442 and a third encapsulation layer 443 that are stacked. The first encapsulation layer 441 and the third encapsulation layer 443 may be made of an inorganic material, the second encapsulation layer 442 may be made of an organic material, and the second encapsulation layer 442 is arranged between the first encapsulation layer 441 and the third encapsulation layer 443, which may ensure that external vapor cannot enter into the light emitting structure layer 43.

In some exemplary implementation modes, as shown in FIG. 4, the touch structure layer 31 of the active area AA may include a buffer layer (omitted in FIG. 4), a first touch conductive layer (TMA), a first touch insulating layer (TLD) 301, a second touch conductive layer (TMB), and a second touch insulating layer (TOC) 302 that are stacked sequentially, for example, the first touch conductive layer may be the bridging layer above described, and the second touch conductive layer may be the touch layer above described. The first touch conductive layer may include the second connection portions 322, and the second touch conductive layer may include the first touch electrodes 311, the second touch electrodes 321, and the first connection portions 312. In some examples, the buffer layer and the first touch insulating layer 301 may be made of an inorganic material, and the second touch insulating layer 302 may be made of an organic material. For example, the buffer layer and the first touch insulating layer 301 may be made of any one or more of silicon oxide (SiOx), silicon nitride (SiNx), and silicon oxynitride (SiON), and may be in a single layer, a plurality of layers, or a composite layer. The second touch insulating layer 302 may be made of polyimide (PI) or the like. However, this embodiment is not limited thereto.

In some exemplary implementation modes, as shown in FIG. 4, the edge area B2 may include a first sub-edge area B11, a second sub-edge area B12, and a third sub-edge area B13 along a direction away from the active area AA. The first sub-edge area B11 at least includes a gate drive circuit, a plurality of touch leads, and a first ground trace. In this example, the touch leads and the first ground trace may be of a double-layer trace structure. For example, one touch lead may include a first sub-lead 313*a* and a second sub-lead 313*b* electrically connected to each other. The first ground trace may include a first sub-ground trace 331*a* and a second sub-ground trace 331*b* electrically connected to each other. The second sub-edge area B12 is located on a side of the first sub-edge area B11 away from the active area AA, and the second sub-edge area B12 at least includes a first isolation dam 513, a second isolation dam 514, and at least one (e.g. three) first Panel Crack Detection (PCD for short) line 516. The at least one first panel crack detection line 516 may be configured to detect the display structure layer 41. The third sub-edge area B13 is located on a side of the second sub-edge area B12 away from the active area AA, and the third sub-edge area B13 at least includes a crack dam 515 and the second ground trace 332.

In some exemplary implementation modes, as shown in FIG. 4, the display panel of the first sub-edge area B11 may include a base substrate 30, and a drive circuit layer 42, a first planarization layer 415, a second planarization layer 416, a first connection electrode 512, an isolation post 511, a cathode 433, an encapsulation layer 44, a plurality of first sub-leads 313*a* and a first sub-ground trace 331 arranged on the encapsulation layer 44, a first touch insulating layer 301, a plurality of second sub-leads 313*b* and a second sub-ground trace 331*b* arranged on the first touch insulating layer 301, and a second touch insulating layer 302 which are arranged sequentially on the base substrate 30. The drive circuit layer 42 of the first sub-edge area B11 may include a transistor and a storage capacitor constituting a gate drive circuit. In some examples, the gate drive circuit of the first sub-edge area B1 may include a scan drive circuit and a light emitting control drive circuit. The edge area B2 is illustrated in FIG. 4 by taking one transistor (e.g. a second transistor 422) and one capacitor (e.g. a first capacitor 424) of the scan drive circuit, and one transistor (e.g. a third transistor 423) and one capacitor (e.g. a second capacitor 425) of the light emission control drive circuit as an example. A film layer structure of the drive circuit layer of the first sub-edge area B1 may be similar to a film layer structure of the drive circuit layer of the active area AA, and therefore will not be described here. The first sub-ground trace 331a and the plurality of first sub-leads 313a are of a structure of a same layer as the first touch conductive layer, the second sub-ground trace 331b and the plurality of second sub-leads 313b are of a structure of a same layer as the second touch conductive layer, and the plurality of first sub-leads 313a and the plurality of second sub-leads 313b can be electrically connected in one-to-one correspondence, thereby realizing a touch lead with a double-layer trace structure. The first sub-ground trace 331a and the second sub-ground trace 331b are electrically connected to each other to achieve the first ground trace of the double-layer trace structure. A guard line is provided between the touch leads and the first ground trace, and the guard line includes a first guard sub-line 315a and a second guard sub-line 315b electrically connected, wherein the first guard sub-line 315a and the first touch conductive layer are of a structure of a same layer, and the second guard sub-line 315b and the second touch conductive layer are of a structure of a same layer. In other words, in this example, the guard line is in a double-layer trace structure. At least one (e.g. two) second panel crack detection lines 314 may also be arranged on a side of the first ground trace away from the touch leads and the guard line. The second panel crack detection line 314 may be configured to detect the touch structure layer 31. The at least one second panel crack detection line 314 and the second touch conductive layer are of a structure of a same layer. However, this embodiment is not limited thereto. In some other examples, the first ground trace, the touch leads, and the guard line may be in a single-layer trace structure, which may be, for example, in a same layer structure as the first touch conductive layer or may be disposed in a same layer as the second touch conductive layer.

In some exemplary implementation modes, as shown in FIG. 4, the display panel of the second sub-edge area B12 may include a base substrate 30, and a composite insulating layer, a first panel crack detection line 516, a low-voltage line 426, a second connection electrode 427, isolation dams (e.g., a first isolation dam 513 and a second isolation dam 514), a first encapsulation layer 441, a third encapsulation layer 443, a first touch insulating layer 301 and a second touch insulating layer 302 which arranged on the base substrate 30. The composite insulating layer may include a first insulating layer 411 to a third insulating layer 413 that are stacked on the base substrate 30. The first panel crack detection line 516 may be arranged on the second insulating layer 412, and may be disposed in a same layer as the second gate metal layer. The low-voltage line 426 may be disposed in a same layer as the first source-drain metal layer of the drive circuit layer 42, and the second connection electrode 427 may be disposed in a same layer as the second source-drain metal layer of the drive circuit layer 42. The cathode 433 may be electrically connected to the second connection electrode 427 through the first connection electrode 512 which may be electrically connected to the low-voltage line 426 through the second connection electrode 427. The first isolation dam 513 is located on a side of the second isolation dam 514 close to the active area AA. The second isolation dam 514 may be formed by stacking a first dam foundation, a second dam foundation, a third dam foundation, and a fourth dam foundation. The first isolation dam 513 may be formed by stacking a second dam foundation, a third dam foundation, and a fourth dam foundation. The first dam foundation may be disposed in a same layer as the first planarization layer 415, the second dam foundation may be disposed in a same layer as the second planarization layer 416, the third dam foundation may be disposed in a same layer as the pixel definition layer 434, and the fourth dam foundation may be disposed in a same layer as the isolation post 511. However, this embodiment is not limited thereto.

In some exemplary implementation modes, as shown in FIG. 4, the display panel of the third sub-edge area B13 may include a crack dam 515 arranged on the base substrate 30, and the second ground trace 332. The crack dam 515 is formed on the composite insulating layer, and may include a plurality of cracks which are arranged at intervals, and the cracks may expose the base substrate 30. The first planarization layer 415 may cover the crack dam 515. The second ground trace 332 is arranged on the first planarization layer 415 covering the crack dam 515. The second touch insulating layer 302 may expose a portion of surfaces of the second ground trace 332. In some examples, an orthographic projection of the first touch insulating layer 301 on the base substrate 30 may not be overlapped with an orthographic projection of the second ground trace 332 on the base substrate 30. The orthographic projection of the second ground trace 332 on the base substrate 30 may be partially overlapped with an orthographic projection of the crack dam 515 on the base substrate 30. However, this embodiment is not limited thereto. For example, the orthographic projection of the first touch insulating layer 301 on the base substrate 30 may be partially overlapped with an orthographic projection of the second ground trace 332 on the base substrate 30. In this example, the crack dam 515 in a concave-convex shape formed in the edge area B1 is a film layer structure for avoiding an influence on the active area AA and the first sub-edge area B11 during cutting of the display motherboard. The plurality of cracks arranged at intervals can not only reduce stresses on the active area AA and the first sub-edge area B11, but also cut off propagation of cracks towards a direction of the active area AA and the first sub-edge area B11.

In some exemplary implementation modes, as shown in FIG. 4, the first ground trace 331 is located in the first sub-edge area B11, the isolation dam is located in the second sub-edge area B12, and the second ground trace 332 is located in the third sub-edge area B13. The orthographic projection of the first ground trace 331 on the base substrate 30 is located on a side of the isolation dam close to the active area AA, and the orthographic projection of the second ground trace 332 on the base substrate 30 is located on a side of the isolation dam away from the active area AA. In this example, the first ground trace 331 and the second ground trace 332 may be of a structure of a same layer, for example, both of which are of a structure of a same layer as the second touch conductive layer. However, this embodiment is not limited thereto. In some other examples, the first ground trace and the second ground trace may be of structures of different layers, for example, the first ground trace may be of a same layer structure with the first touch conductive layer, and the second ground trace may be of a same layer structure with the second touch conductive layer. In some other examples, the second ground trace may be disposed in a same layer as any conductive layer of the touch structure layer close to the base substrate.

In this exemplary embodiment, by arranging the second ground trace 332 in the third sub-edge area B13, the negative charges generated by the friction on the surface of the cover plate may be led out by using the edge ground trace 332. In addition, since the second touch conductive layer has a larger thickness and a smaller resistance than the first touch conductive layer, and the second touch conductive layer is closer to the cover plate than other conductive layers, most static electricity may be effectively led out by arranging the second ground trace 332 to be in the same layer as the second touch conductive layer, thereby reducing a negative electric field formed inside the display panel and improving the illumination problem caused by the negative electric field.

In some exemplary implementation modes, the orthographic projection of the second ground trace 332 on the base substrate 30 may not be overlapped with an orthographic projection of other conductive layers on the base substrate 30. By providing the second ground trace 332 to avoid all the metal film layer layers below, electrostatic damage to metal film layers below the second ground trace 332 can be prevented.

Figure 5:
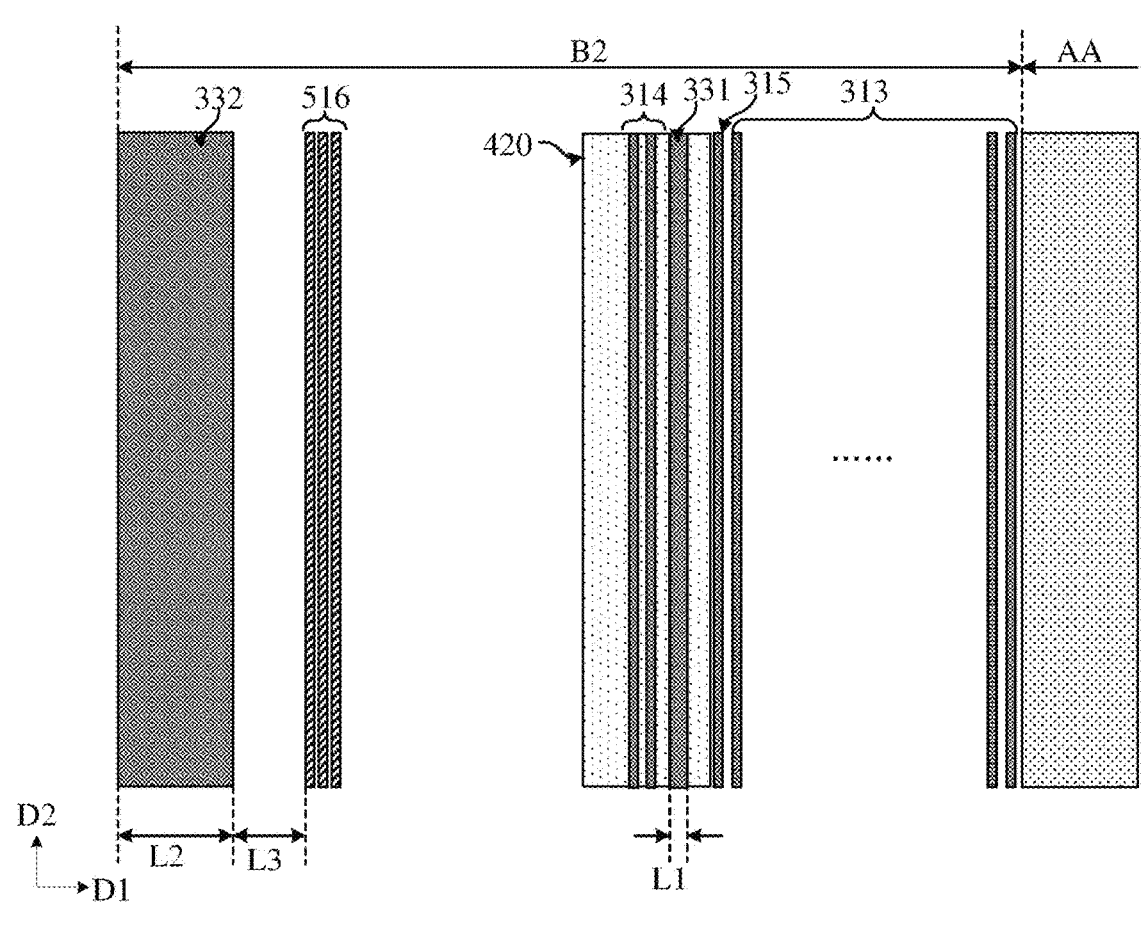
FIG. 5 is a schematic partial enlarged diagram of an area S1 in FIG. 3.

FIG. 5 is a schematic partial enlarged diagram of an area S1 in FIG. 3. The gate drive circuit 420 in the edge area B2 and the positions of a plurality of traces are briefly illustrated in FIG. 5, and the illustration of the rest of the structure is omitted, as shown in FIG. 5, the first ground trace 331 is located on a side of the plurality of touch leads 313 away from the active area AA, a protection line 315 is provided between the first ground trace 331 and the plurality of touch leads 313, and a second panel crack detection line 314 is located on a side of the first ground trace 331 away from the protection line 315 and the plurality of touch leads 313. An orthographic projection of the first ground trace 331 and the second panel crack detection lines 314 on the base substrate may be overlapped with an orthographic projection of the gate drive circuit 420 on the base substrate. An orthographic projection of the first panel crack detection lines 516 on the base substrate is located between an orthographic projection of the second ground trace 332 on the base substrate and the orthographic projection of the second panel crack detection lines 314 on the base substrate. A closest metal trace on a side of the orthographic projection of the second ground trace 332 on the base substrate close to the active area AA is a first panel crack detection line 516.

In some exemplary implementation modes, as shown in FIG. 5, a width of the second ground trace 332 is greater than a width of the first ground trace 331. In this example, a width of a trace refers to a width of the trace on the display touch substrate formed after being cut by a cutting equipment. In some examples, the width L1 of the first ground trace 331 may be about 13.5 microns to 16.5 microns, for example, may be about 15 microns. The width L2 of the second ground trace 332 may be about 100 microns to 300 microns, for example, may be about 125 microns or may be about 300 microns. The spacing L3 between the second ground trace 332 and the nearest metal trace (i.e. the first panel crack detection line 516) may be about 67.5 microns to 82.5 microns, for example, may be about 75 microns. However, this embodiment is not limited thereto.

Figure 6:
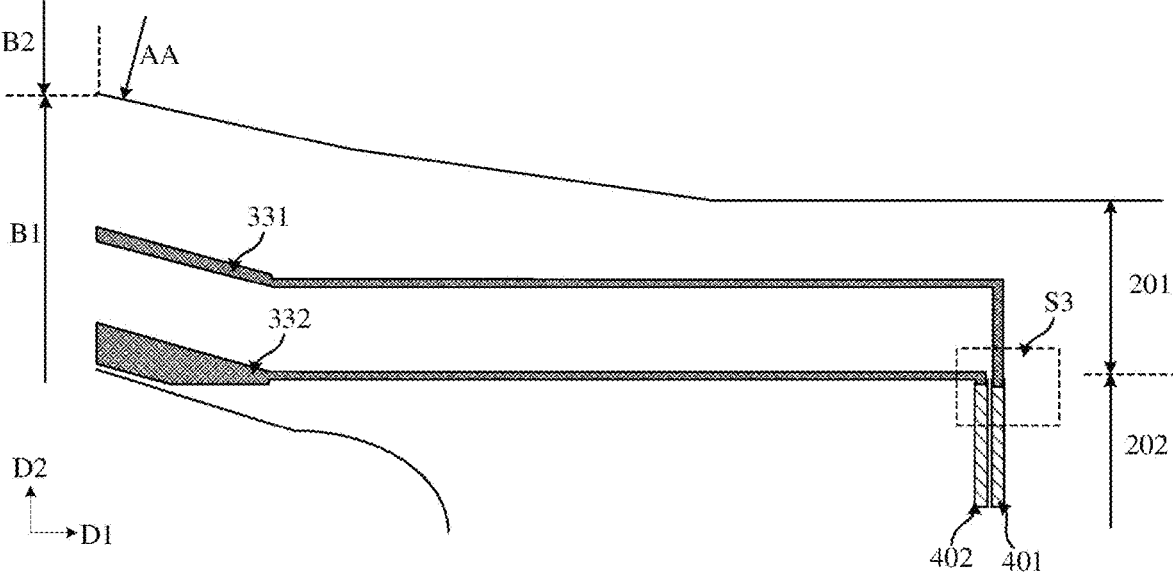
FIG. 6 is a schematic partial enlarged diagram of an area S2 in FIG. 3.
Figure 7:
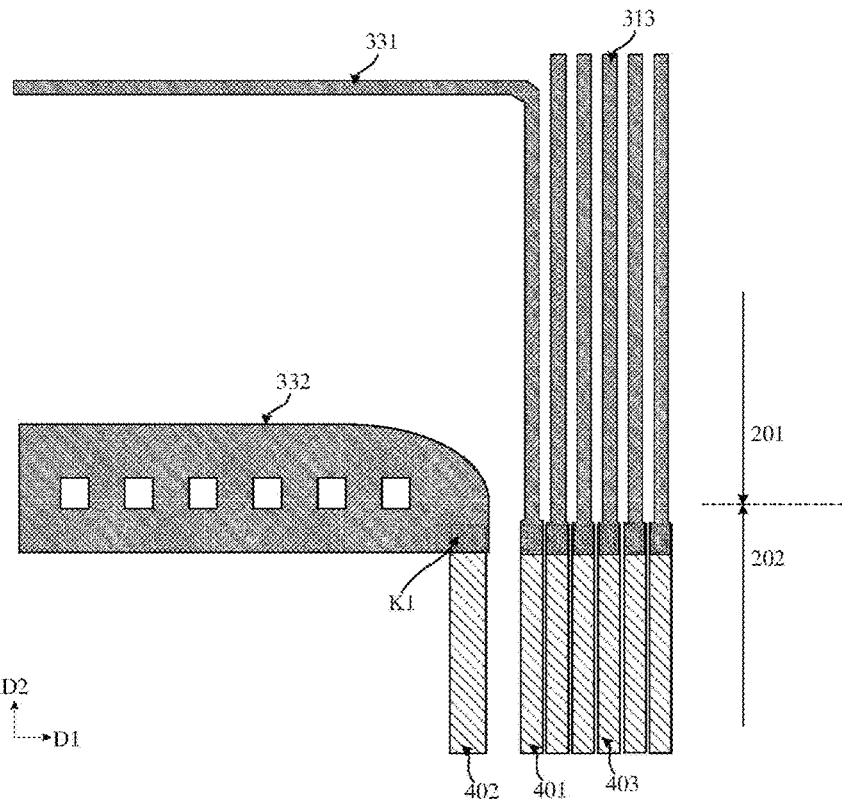
FIG. 7 is a schematic partial enlarged diagram of an area S3 in FIG. 6.

FIG. 6 is a schematic partial enlarged diagram of an area S2 in FIG. 3. FIG. 7 is a schematic partial enlarged diagram of an area S3 in FIG. 6. The positions of the first ground trace 331 and the second ground trace 332 are briefly illustrated in both FIGS. 6 and 7, and the illustration of the rest of the structure is omitted. As shown in FIGS. 6 and 7, the first ground trace 331 and the second ground trace 332 may extend from the edge area B2 to the bonding area B1. In a bending area 202 between the first fan-out area 201 and the second fan-out area 203, the first ground trace 331 is disconnected and electrically connected through a first bending trace 401; the second ground trace 332 is disconnected and electrically connected through a second bending trace 402; the touch lead 313 is disconnected and electrically connected through a third bending trace 403, as shown in FIG. 7, at the junction of the first fan-out area 201 and the bending area 202 of the bonding area B1, the first ground trace 331 may be electrically connected with the first bending trace 401 through a first via K1, the second ground trace 332 may be electrically connected with the second bending trace 402 through the first via K1, and the touch lead 313 may be electrically connected with the third bending trace 403 through the first via K1. In this example, the first ground trace 331, the second ground trace 332, and the touch lead 313 may be of a structure of a same layer as the second touch conductive layer, and the first bending trace 401, the second bending trace 402, and the third bending trace 403 may be of a structure of a same layer as the first source-drain metal layer. In this example, by connecting the first ground trace 331 and the second ground trace 332 with a layer change through the bending traces in the bending area 202, the film thickness of the bending area 202 can be reduced, thereby facilitating bending.

In some examples, as shown in FIG. 7, a hole may be drilled in the second ground trace 332 of the first fan-out area 201 to avoid a large area contact between the second ground trace 332 and the second touch insulating layer, resulting in the problem of peeling of the film layer.

Figure 8:
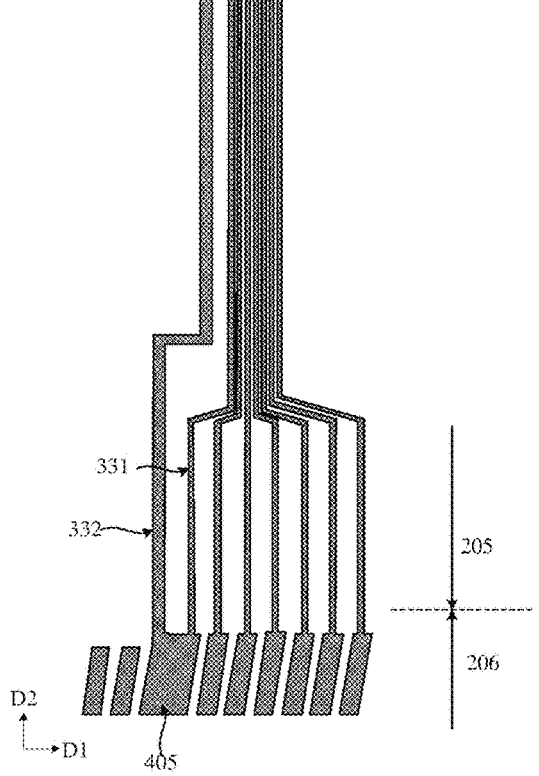
FIG. 8 is a partial schematic diagram of a bonding pin area of a bonding area of at least one embodiment of the present disclosure.

FIG. 8 is a partial schematic diagram of a bonding pin area of a bonding area of at least one embodiment of the present disclosure. In some exemplary implementation modes, as shown in FIG. 8, the bonding pin area 206 is provided with a plurality of bonding pins (e.g. including a ground pin 405). The first ground trace 331 and the second ground trace 332 extend to the bonding pin area 206 and are electrically connected to the ground pin 405 for subsequent bonding connection to the flexible circuit board. In the bonding pin area 206, the first ground trace 331, the second ground trace 332, and the ground pin 405 may be of an integral structure, for example, each of which is of a structure of a same layer as the second touch conductive layer. However, this embodiment is not limited thereto. For example, the bonding pin area may include a plurality of ground pins, and the first ground trace and the second ground trace may be electrically connected to different ground pins in the bonding pin area.

The second ground trace is illustrated by a plurality of examples below. Description is given by the second ground trace 332 of the area S1 in FIG. 3 as an example in the following examples. The second ground trace 332 may be of a structure of a same layer as the second touch conductive layer. In this example, a direction along the active area AA toward the edge area B2 may be a fourth direction, and a direction which is in a same plane as the fourth direction and intersects with the fourth direction is a fifth direction. For example, the fifth direction is in the same plane as the fourth direction, and the fifth direction is perpendicular to the fourth direction. In the area S1, the first direction D1 may be parallel to the fourth direction and the second direction D2 may be parallel to the fifth direction.

Figures 9, 10:
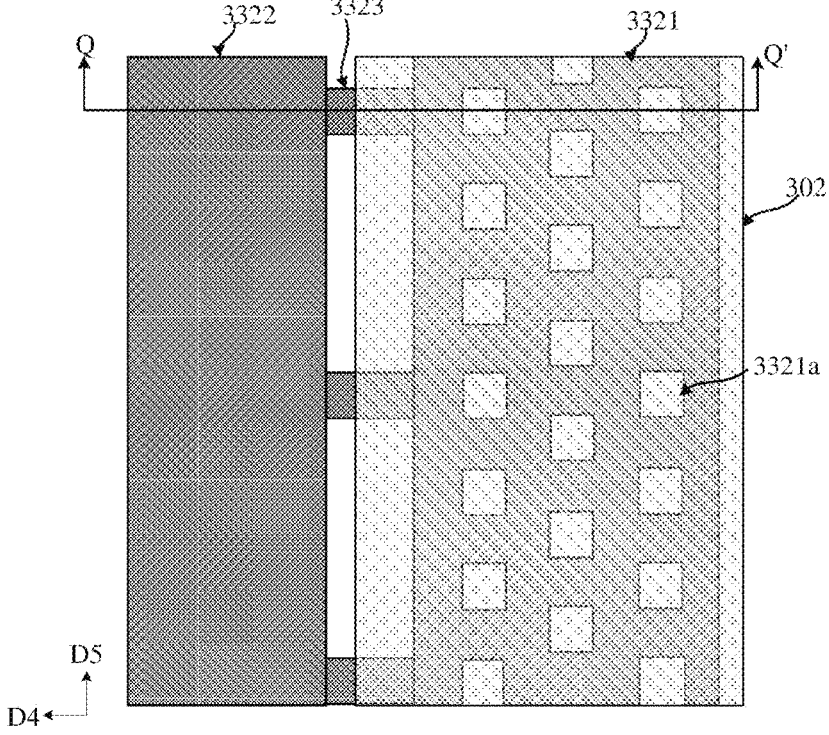
FIG. 9 is a schematic diagram of a second ground trace of at least one embodiment of the present disclosure.
FIG. 10 is a partial cross-sectional schematic diagram along a Q-Q' direction in FIG. 9.

FIG. 9 is a schematic diagram of a second ground trace of at least one embodiment of the present disclosure. FIG. 10 is a partial cross-sectional schematic diagram along a Q-Q' direction in FIG. 9. In some exemplary implementation modes, as shown in FIG. 9, the second ground trace 332 may include an outer ring trace 3322, an inner ring trace 3321, and a connection trace 3323. The outer ring trace 3322 is located on a side of the inner ring trace 3321 away from the active area AA, and the outer ring trace 3322 and the inner ring trace 3321 are electrically connected by the plurality of connection traces 3323. The orthographic projection of the connection trace 3323 on the base substrate 30 may be rectangular. One end of the connection trace 3323 is electrically connected with the outer ring trace 3322 and the other end is electrically connected with the inner ring trace 3321. The outer ring trace 3322, the inner ring trace 3321, and the connection trace 3323 may be of an integral structure. A plurality of apertures 3321a are provided in the inner ring trace 3321, and the plurality of apertures 3321a may be arranged in three columns in a fourth direction D4. The apertures 3321a in adjacent two columns are misaligned in a fifth direction D5. However, this embodiment is not limited thereto.

In some exemplary implementation modes, as shown in FIGS. 9 and 10, the orthographic projection of the second touch insulating layer 302 on the base substrate 30 partially overlaps the orthographic projection of the second ground trace 332 on the base substrate 30. For example, the second touch insulating layer 302 may cover the inner ring trace 3321, and not cover the outer ring trace 3322. In this example, by using aperture design on the inner ring trace 3321, it is possible to avoid the second ground trace 332 from being in direct contact with the second touch insulating layer 302 over a large area, and it is possible to avoid peeling of the film layer.

Figure 11:
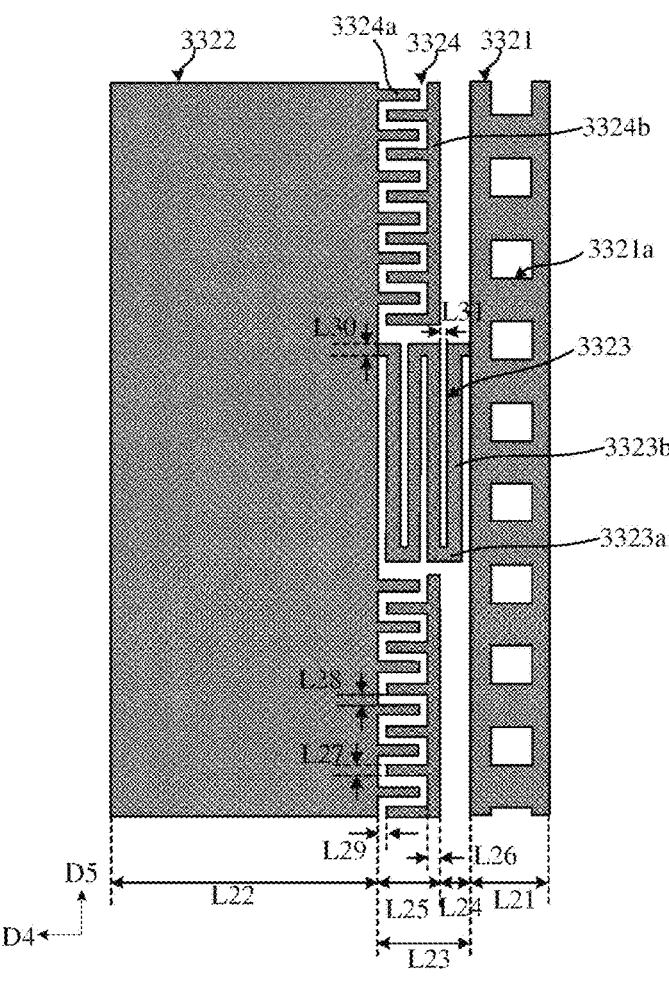
FIG. 11 is another schematic diagram of a second ground trace of at least one embodiment of the present disclosure.

FIG. 11 is another schematic diagram of a second ground trace of at least one embodiment of the present disclosure. In some exemplary implementation modes, as shown in FIG. 11, the second ground trace 332 may include an outer ring trace 3322, an inner ring trace 3321 and connection traces 3323. The outer ring trace 3322 is located on a side of the inner ring trace 3321 away from the active area AA, and the outer ring trace 3322 and the inner ring trace 3321 are electrically connected by the plurality of connection traces 3323.

In some exemplary implementation modes, as shown in FIG. 11, a plurality of connection traces 3323 are located between the outer ring trace 3322 and the inner ring trace 3321. One end of a single connection trace 3323 is electrically connected to the outer ring trace 3322 and the other end is electrically connected to the inner ring 3321. The outer ring trace 3322, the inner ring trace 3321, and the connection trace 3323 may be of an integral structure. In some examples, the orthographic projection of the single connection trace 3323 on the base substrate may be S-shaped. In some examples, the resistance of the single connection trace 3323 may be about 10 ohms to 20 ohms, for example, may be about 12 ohms. A single connection trace 3323 may include a plurality of first extension segments 3323a and second extension segments 3323b which are connected sequentially. The first extension segments 3323a may extend along the fourth direction D4, and the second extension segments 3323b may extend along the fifth direction D5. The second extension segments 3323b, the first extension segments 3323a and the second extension segment 3323b which are connected sequentially may form a circuity. A plurality of circuities may be arranged sequentially along the fourth direction D4. A single connection trace 3323 may include a plurality of circuities. For example, the number of circuities of a single connection trace 3323 may be about 3 to 5. As shown in FIG. 11, a single connection trace 3323 may include three circuities. In some examples, a length of a first extension segment 3323a (i.e. a length in the fourth direction D4) is less than a length of a second extension segment 3323b (i.e. a length in the fifth direction D5). A width of the first extension segment 3323a (i.e. a length in the fifth direction D5) may be substantially the same as a width of the second extension segment 3323b (i.e. a length in the fourth direction D4). For example, the width L30 of the first extension segment 3323a may be about 3 microns to 5 microns, which may be, for example, about 5 microns. A spacing L31 between adjacent second extension segments 3323b may be about 3 microns to 5 microns, which may be, for example, about 5 microns. The spacing between the second extension segment 3323b and an adjacent outer ring trace 3322, and the spacing between the second extension segment 3323b and an adjacent inner ring trace 3321 may be substantially the same as the spacing L31. However, this embodiment is not limited thereto. For example, a length of the first extension segment of the connection trace may be greater than a length of the second extension segment, and the first extension segment, the second extension segment, and the first extension which are connected sequentially may form a circuity, a plurality of which may be arranged sequentially along the fifth direction. In this exemplary implementation mode, the outer ring trace and the inner ring trace are electrically connected by the connection traces, and the length of the connection traces is extended through multiple foldbacks, so that the ground resistance can be improved, thereby increasing the resistance of the second ground trace and improving the electrostatic protection effect.

In some exemplary implementation modes, the number of the second connection traces may be matched according to the number of total resistance and capacitance of the second ground trace traces to avoid providing too many connection traces, which leads to introduction of external charges due to too small parallel resistance, invalidating an ESD test, or providing too few connection traces, which leads to the circuit being burned out and invalid by an instantaneous ESD surge current due to process risk. In some examples, the quantity of connection traces can be less than or equal to 40. For example, the quantity of connection traces may be about 20 to 40, for example, about 6, 19, or 40.

Figure 12A:
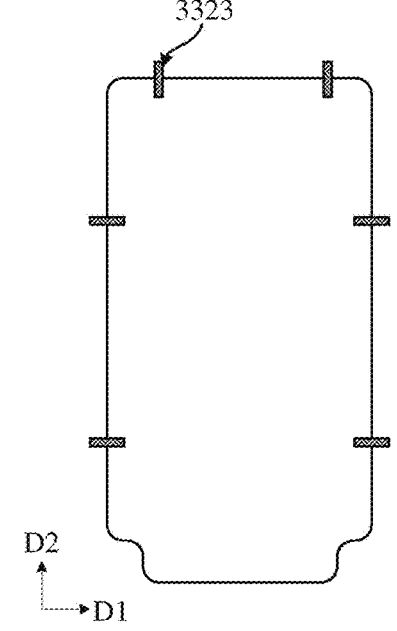
FIGS. 12A to 12C are schematic diagrams of the arrangement of connection traces according to at least one embodiment of the present disclosure.
Figure 12B:
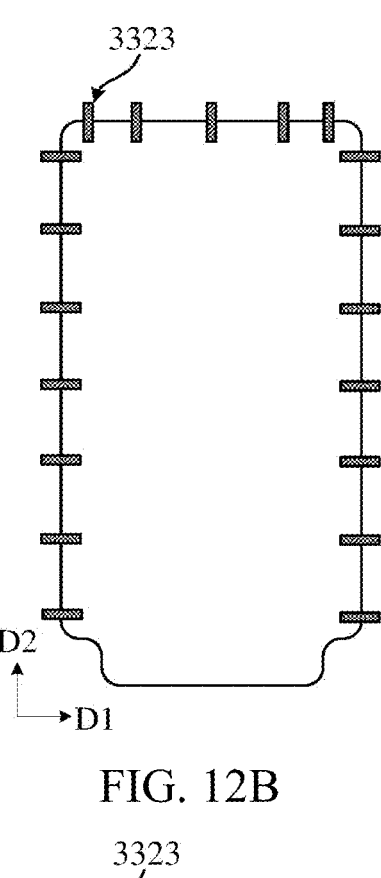
Figure 12C:
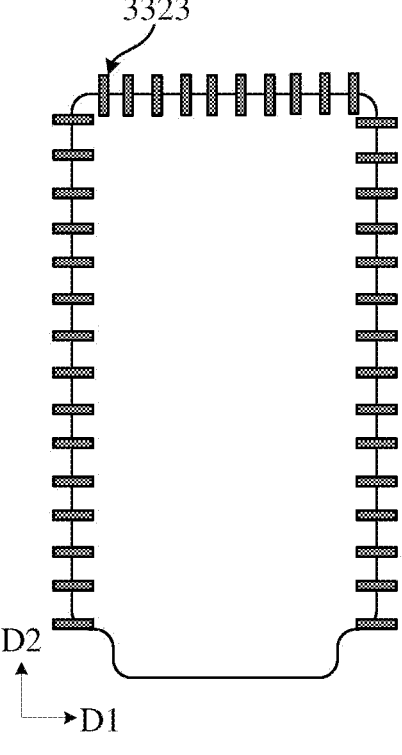

FIGS. 12A to 12C are schematic diagrams of an arrangement of connection traces according to at least one embodiment of the present disclosure. The positions of a plurality of connection traces are briefly illustrated in FIGS. 12A to 12C. As shown in FIG. 12A, the second ground trace may include six connection traces 3323. The six connection traces 3323 may be located in the upper side, left side and right side edge areas, respectively, and two connection traces 3323 are arranged on each side. As shown in FIG. 12B, the second ground trace may include 19 connection traces 3323. The 19 connection traces 3323 may be arranged in the upper side, left side and right side edge areas respectively, wherein, 5 connection traces are arranged in the upper side edge area and 7 connection traces are arranged in the left side and right side edge areas respectively. As shown in FIG. 12C, the second ground trace may include 40 connection traces 3323. The 40 connection traces 3323 may be arranged in the upper side, left side and right side edge areas respectively, wherein, 10 connection traces are arranged in the upper side edge area and 15 connection traces are arranged in the left side and right side edge areas respectively. In some examples, arrangement positions of the connection traces 3323 in the left edge area and right edge area may be symmetrical with respect to a centerline of the display panel in the first direction D1, and the arrangement positions of the connection traces 3323 in the upper edge area may be symmetrical with respect to the centerline of the display panel in the first direction D1. However, this embodiment is not limited thereto. In this exemplary implementation, by controlling the number of connection traces, it is possible to increase the resistance of the second ground trace and reduce a risk of electrostatic breakdown of adjacent metal film layers.

In some exemplary implementation modes, as shown in FIG. 11, the inner ring trace 3321 is provided with a plurality of apertures 3321a arranged in a column in the fourth direction D4. The plurality of apertures 3321a are arranged sequentially in a fifth direction D5 perpendicular to the fourth direction D4. In some examples, an orthographic projection of the aperture 3321a on the base substrate may be rectangular. A size of an aperture 3321a may be substantially the same as a dimension of a sub-pixel of the active area, and a spacing between adjacent apertures 3321a may be substantially the same as a spacing between adjacent sub-pixels of the active area. For example, a dimension of the orthographic projection of the aperture 3321a on the base substrate may be about 5 microns×5 microns. However, this embodiment is not limited thereto. For example, the orthographic projection of the aperture on the base substrate may be in another shape, such as a circle or an ellipse. In this example, the direct contact area between the second ground trace and the second touch insulating layer can be reduced by providing the apertures in the inner ring trace, thereby reducing the risk of peeling of the film layer.

In some exemplary implementation modes, as shown in FIG. 11, a plurality of anti-static capacitors 3324 are disposed between the outer ring trace 3322 and the inner ring trace 3321. The anti-static capacitors 3324 may be arranged within a spacing between adjacent connection traces 3323. At least one anti-static capacitor 3324 may include a first plate 3324a and a second plate 3324b. The first plate 3324a and the outer ring trace 3322 may be of an integral structure. The second plate 3324b is located on a side of the first plate 3324a close to the inner ring trace 3321. In this example, the outer ring trace 3322, the inner ring trace 3321, the connection trace 3323 and the first plate 3324a of the anti-static capacitor 3324 may be of an integral structure. The first plate 3324a has a plurality of first comb portions facing the second plate 3324b, and the second plate 3324b has a plurality of second comb portions facing the first plate 3324a. A plurality of first comb portions and second comb portions may be interspersed with each other. In this way, an overlapping area between the two plates may be increased in a limited space, and a capacitance spacing may be reduced, thus increasing the capacitance. However, this embodiment is not limited thereto. In this example, by arranging the anti-static capacitors between the inner ring trace and the outer ring trace, the anti-static capacitor may be charged when instantaneous high-voltage static electricity passes, which plays a role in dividing voltage and improves a risk of electrostatic breakdown.

In some exemplary implementation modes, as shown in FIG. 11, the width ratio of the outer ring trace 3322 and the inner ring trace 3321 may be about 2.7 to 3.3, for example, may be about 3. In some examples, the width L21 of the inner ring trace 3321 may be about 15 microns to 25 microns, for example, may be about 20 microns. The width L22 of the outer ring trace 3322 may be about 50 microns to 70 microns, for example, may be about 60 microns. The spacing L23 between the outer ring trace 3322 and the inner ring trace 3321 may be about 50 microns to 60 microns, for example, may be about 45 microns or 55 microns. The spacing L24 between the second plate 3324b of the anti-static capacitor 3324 and the inner ring trace 3321 may be about 12 microns to 35 microns, for example, may be about 15 microns or 30 microns. The distance L25 between an edge of the second plate 3324b of the anti-static capacitor 3324 away from the outer ring trace 3322 and an edge of the outer ring trace 3322 close to the second plate 3324b may be about 21 microns to 28 microns, for example, may be about 25 microns. The width L26 of the main body portion of the second plate 3324b of the anti-static capacitor 3324 extending in the fifth direction D5, the width L27 of the second comb portion of the second plate 3324b of the anti-static capacitor 3324, the width of the first comb portion of the first plate 3324a, and the spacing L28 between the first comb portion of the first plate 3324a and the second comb portion of the second plate 3324b may be substantially the same, for example, may be about 4 microns to 6 microns, for example, may be about 5 microns. The spacing L29 between the second comb portion of the second plate 3324b of the anti-static capacitor 3324 and the outer ring trace 3322 may be about 4 microns to 6 microns, for example, may be about 5 microns. However, this embodiment is not limited thereto. In this example, better electrostatic conduction effect can be achieved by providing the second ground trace with the above size.

In the present exemplary implementation mode, the second ground trace provided in the edge area can lead out an induced charges generated inside the display panel through the connection trace, and the combined structure of the connection trace and the anti-static capacitor can buffer the discharge time constant of an ESD test to avoid introducing an electrostatic charge from the outside to the inside of the display panel, thereby protecting the internal circuit.

Figure 13:
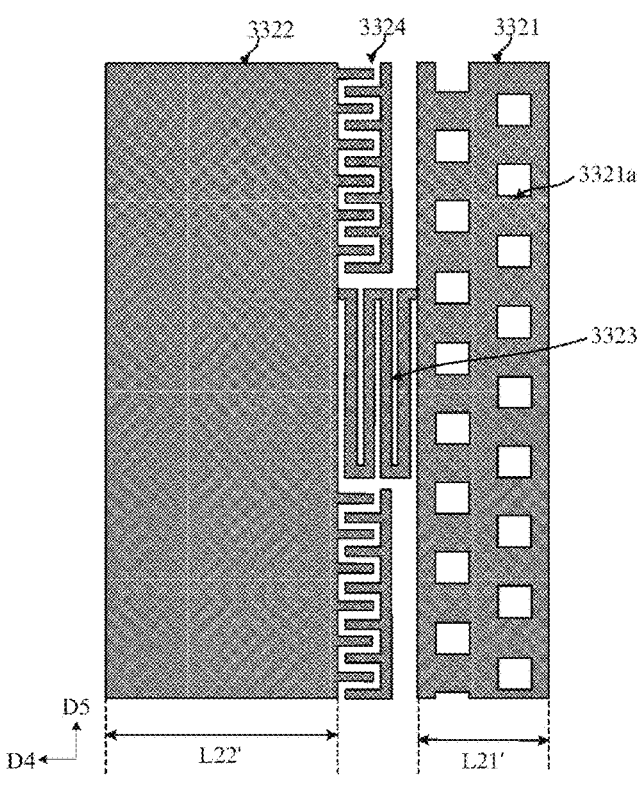
FIG. 13 is another schematic diagram of a second ground trace of at least one embodiment of the present disclosure.

FIG. 13 is another schematic diagram of a second ground trace of at least one embodiment of the present disclosure. In some exemplary implementation modes, as shown in FIG. 13, the inner ring trace 3321 of the second ground trace 332 is provided with a plurality of apertures 3321a, and the plurality of apertures 3321a are arranged in two columns along the fourth direction D4. The apertures 3321a in adjacent two columns are arranged in a staggered manner in the fifth direction D5.

In this example, one aperture 3321a in the first column of apertures (for example, a column of apertures close to the active area) is aligned in the fourth direction D4 with the spacing between two adjacent apertures 3321a in the second column of apertures (for example, a column of apertures away from the active area). In some examples, the width L21' of the inner ring trace 3321 may be about 67 microns to 83 microns, for example, may be about 75 microns. The width L22' of the outer ring trace 3322 may be about 50 microns to 70 microns, for example, may be about 60 microns. However, this embodiment is not limited thereto. The remaining structure of the second ground trace of this embodiment may be described with reference to the embodiment shown in FIG. 11, so it will not be repeated here.

Figure 14:
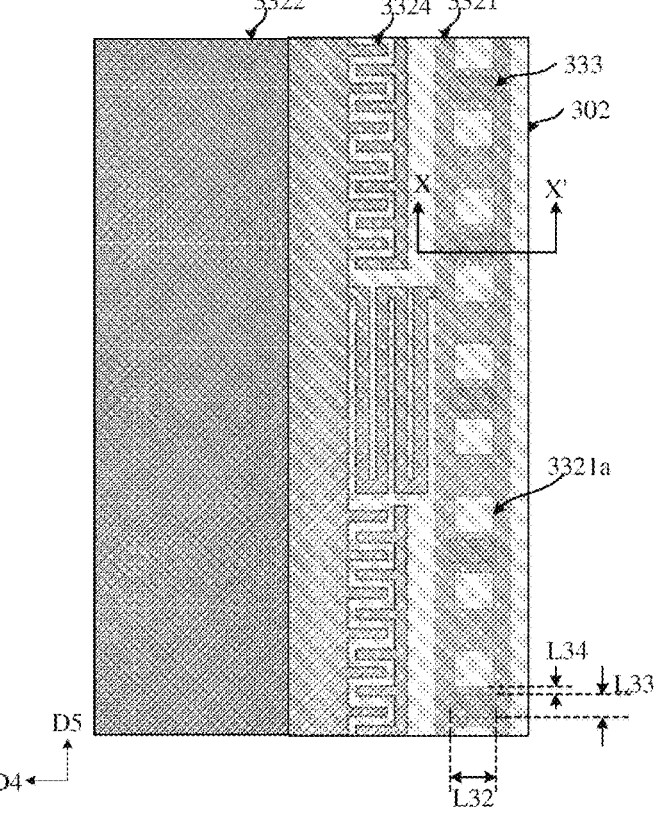
FIG. 14 is another schematic diagram of a second ground trace of at least one embodiment of the present disclosure.
Figure 15:
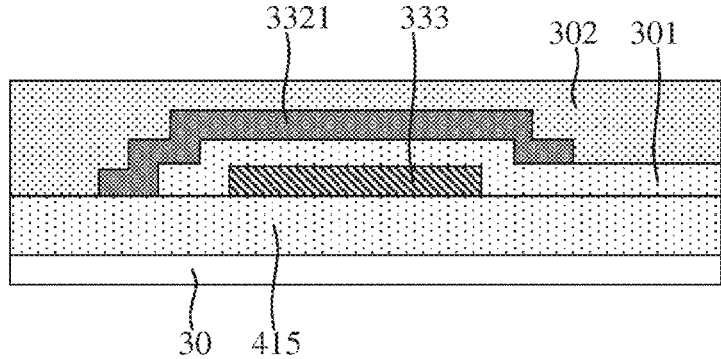
FIG. 15 is a partial cross-sectional schematic diagram along a X-X' direction in FIG. 14.

FIG. 14 is another schematic diagram of a second ground trace of at least one embodiment of the present disclosure. FIG. 15 is a partial cross-sectional schematic diagram along a X-X' direction in FIG. 14. In some exemplary implementation modes, as shown in FIGS. 14 and 15, an auxiliary electrode 333 is provided on a side of the inner ring trace 3321 of the second ground trace 332 close to the base substrate 30. The auxiliary electrode 333 may be of a structure of a same layer as the first touch conductive layer. The first touch insulating layer 301 may cover the auxiliary electrode 333. The auxiliary electrode 333 and the inner ring trace 3321 of the second ground trace 332 can serve as two plates of a capacitor to form a protective capacitor for protection. In this example, the auxiliary electrode 333 is a dummy conductive structure and has no electrical connection relationship. In some examples, the orthographic projection of the auxiliary electrode 333 on the base substrate 30 may be rectangular. The orthographic projections of the auxiliary electrodes 333 on the base substrate 30 may be arranged at intervals between the orthographic projections of the plurality of apertures 3321*a* on the base substrate. The orthographic projection of the auxiliary electrode 333 on the base substrate 30 does not overlap the orthographic projection of the aperture 3321*a* on the base substrate 30, for example, the plurality of apertures 3321*a* are arranged in a column along the fourth direction D4, the plurality of auxiliary electrodes 333 may be arranged in a column along the fourth direction D4, and in the fifth direction D5, the plurality of auxiliary electrodes 333 and the plurality of apertures 3321*a* may be arranged at intervals. For example, one auxiliary electrode 333 may be arranged at intervals of two apertures 3321*a*. However, this embodiment is not limited thereto. For example, one aperture and one auxiliary electrode may be arranged at intervals, or one auxiliary electrode may be arranged at intervals of three or more apertures.

In some examples, as shown in FIG. 14, the length of the auxiliary electrode 333 in the fourth direction D4 may be greater than the length of the aperture 3321*a* in the fourth direction D4, and the length of the auxiliary electrode 333 in the fifth direction D5 may be less than the length of the aperture 3321*a* in the fifth direction D5. Among them, the length L32 of the auxiliary electrode 333 in the fourth direction D4 may be about 9 microns to 11 microns, for example, about 10 microns, and the length L33 in the fifth direction D5 may be about 3.5 microns to 4.5 microns, for example, about 4 microns. The spacing L34 between the auxiliary electrode 333 and an adjacent aperture 3321*a* may be about 1.5 microns to 2 microns, for example, may be about 1.75 microns. The length of the aperture 3321*a* in the fourth direction D4 may be about 5 microns, and the length in the fifth direction D5 may be about 5 microns. However, this embodiment is not limited thereto.

The remaining structure of the second ground trace of this embodiment can be described with reference to the embodiment shown in FIG. 11, so that the description will not be repeated here.

Figure 16:
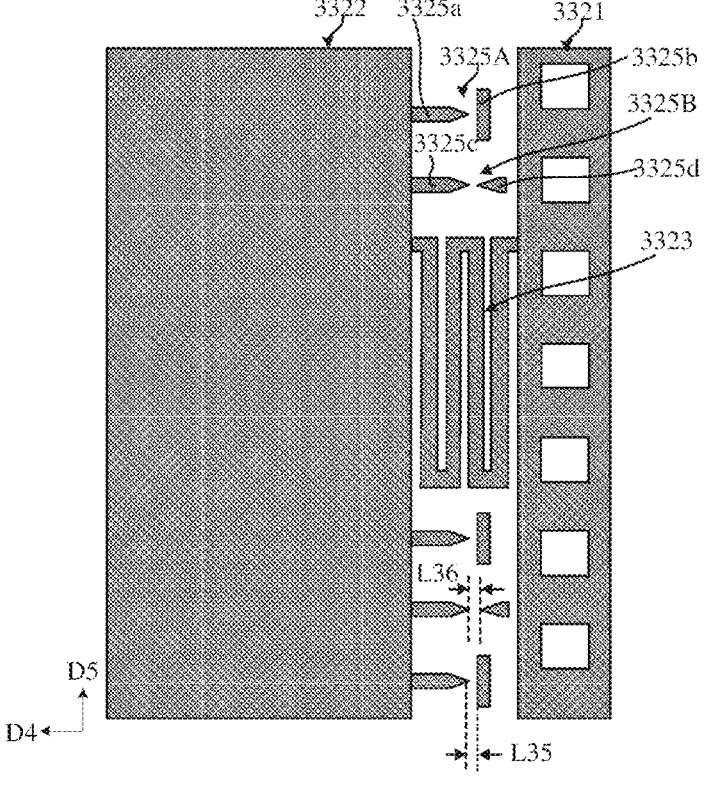
FIG. 16 is another schematic diagram of a second ground trace of at least one embodiment of the present disclosure.

FIG. 16 is another schematic diagram of a second ground trace of at least one embodiment of the present disclosure. In some exemplary implementation modes, as shown in FIG. 16, a plurality of tip discharge structures (e.g. a first tip discharge structure 3325A and a second tip discharge structure 3325B) are disposed between the inner ring trace 3321 and the outer ring trace 3322 of the second ground trace 332. The plurality of tip discharge structures may be arranged within the spacing between adjacent connection traces 3323. The first tip discharge structure 3325*a* may include a first electrode 3325*a* and a second electrode 3325*b*, the first electrode 3325*a* and the outer ring trace 3322 may be of an integral structure, and the second electrode 3325*b* may be located between the first electrode 3325*a* and the inner ring trace 3321. The second electrode 3325*b* is a dummy conductive structure and has no electrical connection relationship. The first electrode 3325*a* has a first tip, and the first tip of the first electrode 3325*a* faces the second electrode 3325*b*. There is a gap between the first tip of the first electrode 3325*a* and the second electrode 3325*b*. The orthographic projection of the second electrode 3325*b* on the base substrate may be rectangular. The second tip discharge structure 3325B may include a first electrode 3325*c* and a second electrode 3325*d*, the first electrode 3325*c* and the outer ring trace 3322 may be of an integral structure, and the second electrode 3325*d* is located between the first electrode 3325*c* and the inner ring trace 3321. The second electrode 3325*d* is a dummy conductive structure and has no electrical connection relationship. The first electrode 3325*c* has a first tip, the second electrode 3325*d* has a second tip, and the second tip of the second electrode 3325*d* faces the first tip of the first electrode 3325*c*, and there is a gap between the first tip of the first electrode 3325*c* and the second tip of the second electrode 3325*d*. The first tip discharge structure 3325A has a tip-to-wire structure, and the second tip discharge structure 3325B has a tip-to-tip structure. In some examples, the tip-to-tip structure and the tip-to-wire structure may be arranged at intervals. A plurality of tip discharge structures of this example are designed using a combination of tip-to-tip structures and tip-to-wire structures, which can improve the influence of process limitations to ensure the function of the tip discharge structures. However, this embodiment is not limited thereto. In some other examples, the tip discharge structures of the second ground trace may all be tip-to-wire structures or may all be tip-to-tip structures.

In some exemplary implementation modes, as shown in FIG. 16, the spacing L35 between the first tip of the first electrode 3325*a* and the second electrode 3325*b* of the first tip discharge structure 3325*a* may be about 2 microns to 3.5 microns, for example, may be about 3 microns. The spacing L36 between the first tip of the first electrode 3325*c* and the second tip of the second electrode 3325*d* of the second tip discharge structure 3325B may be about 2 microns to 3.5 microns, for example, may be about 3 microns. In some examples, the spacings L35 and L36 may be substantially the same. In some other examples, the spacing L35 may be different from L36, for example, the spacing L35 may be about 2.5 microns and the spacing L36 may be about 3 microns. However, this embodiment is not limited thereto.

The remaining structure of the second ground trace of this embodiment can be described with reference to the foregoing embodiments, so that they will not be described here.

In the present exemplary implementation mode, by providing a tip discharge structure between the outer ring trace and the inner ring trace of the second ground trace, an electrostatic absorption circuit can be added, thereby improving a risk of electrostatic breakdown.

Figure 17:
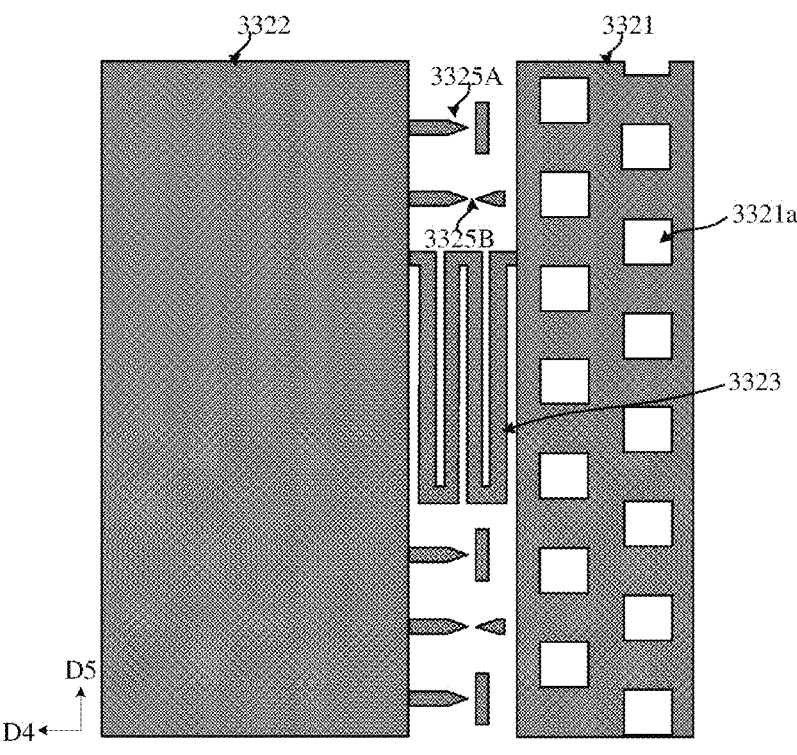
FIG. 17 is another schematic diagram of a second ground trace of at least one embodiment of the present disclosure.

FIG. 17 is another schematic diagram of a second ground trace of at least one embodiment of the present disclosure. In some exemplary implementation modes, as shown in FIG. 17, the inner ring trace 3321 of the second ground trace 332 is provided with a plurality of apertures 3321*a*, and the plurality of apertures 3321*a* are arranged in two columns along the fourth direction D4. Two adjacent columns of apertures 3321*a* are arranged in a staggered manner in the fifth direction D5. In this example, the width of the inner ring trace 3321 may be about 67 microns to 83 microns, for example, about 75 microns, and the width of the outer ring trace 3322 may be about 50 microns to 70 microns, for example, about 60 microns. However, this embodiment is not limited thereto. The remaining structure of the second ground trace of this embodiment can be described with reference to the embodiment shown in FIG. 16 and therefore will not be described here.

Figure 18:
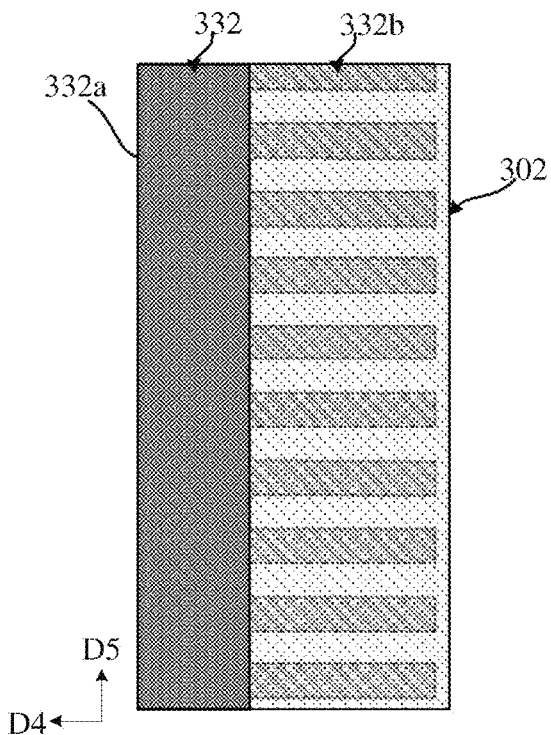
FIG. 18 is another schematic diagram of a second ground trace of at least one embodiment of the present disclosure.

FIG. 18 is another schematic diagram of a second ground trace of at least one embodiment of the present disclosure. In some exemplary implementation modes, as shown in FIG. 18, a side of the second ground trace 332 close to the active area is serrated. The second ground trace 332 may have a main body 332*a* and a serrated portion 332*b*. The serrated portion 332*b* includes a plurality of convex strips extending from the main body 332*a* to a side of the active area. The shape and size of the plurality of convex strips can be substantially the same. The orthographic projection of the convex strip on the base substrate can be rectangular. The spacing between adjacent convex strips may be substantially the same. For example, the spacing between adjacent convex strips and the length of the convex strip in the fifth direction D5 may be substantially the same. The second touch insulating layer 302 may cover the serrated portion 332b of the second ground trace 332. In this example, by forming the serrated portion 332b in the second ground trace 332, the direct contact area between the second ground trace 332 and the second touch insulating layer 302 can be reduced and peeling of the film layer can be prevented.

Figures 19, 20:
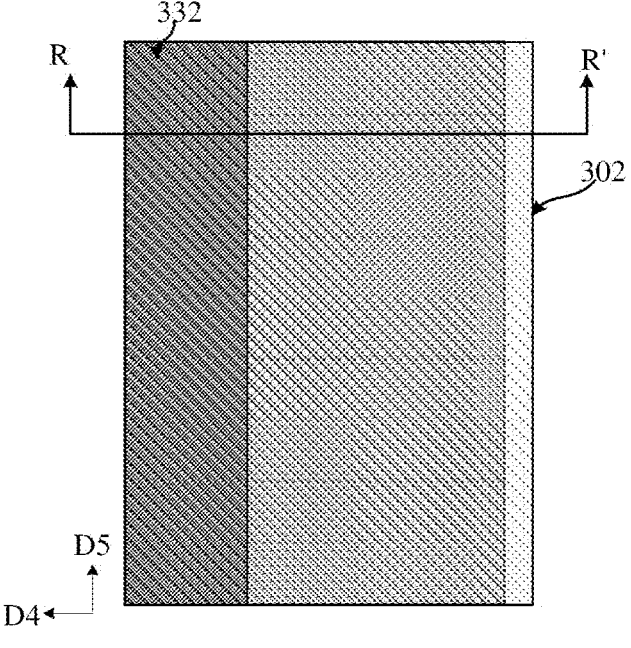
FIG. 19 is another schematic diagram of a second ground trace of at least one embodiment of the present disclosure.
FIG. 20 is a schematic partial sectional view along an R-R' in FIG. 19.

FIG. 19 is another schematic diagram of a second ground trace of at least one embodiment of the present disclosure. FIG. 20 is a schematic partial sectional view along an R-R' in FIG. 19. In some exemplary implementation modes, as shown in FIGS. 19 and 20, the second ground trace 332 may be of a strip structure and are not provided with apertures. An auxiliary ground trace 335 may be provided on a side of the second ground trace 332 close to the base substrate 30. The auxiliary ground trace 335 may be of a structure of a same layer as the first touch conductive layer. The ortho-graphic projection of the auxiliary ground trace 335 on the base substrate 30 and the orthographic projection of the second ground trace 332 on the base substrate may partially overlap. The auxiliary ground trace 335 may be provided in the edge area and may not be provided in the bonding area. For example, in FIG. 6, the auxiliary ground trace 335 may extend only to the junction of the bonding area B2 and the edge area B1, and the auxiliary ground trace may not be provided in the first fan-out area 201 of the bonding area B2 to avoid affecting other traces of the first touch conductive layer at that position. In some examples, the first touch insulating layer 301 may not cover the auxiliary ground trace 335, such that the auxiliary ground trace 335 and the second ground trace 332 may be in direct contact for connection. However, this embodiment is not limited thereto, for example, the first touch insulating layer may cover a portion of the auxiliary ground trace, and another portion of the auxiliary ground trace that is not covered may be in direct contact with the second ground trace. The second touch insulating layer 302 may cover a portion of the second ground trace 332.

In the present exemplary implementation mode, by pro-viding the auxiliary ground trace for the second ground trace, the charges from the cover plate can be more effec-tively blocked.

Figures 21, 22:
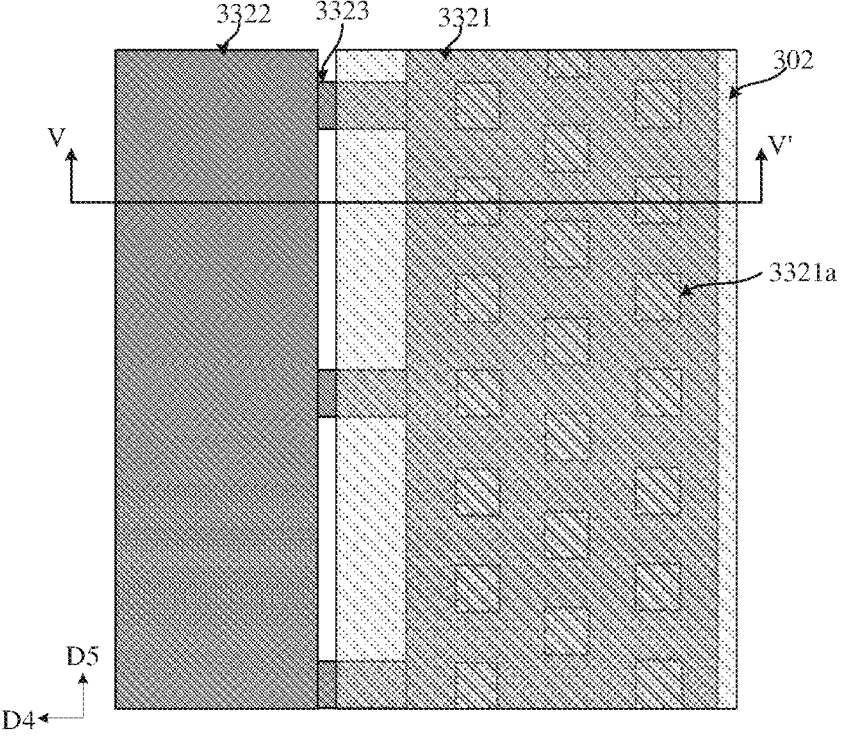
FIG. 21 is another schematic diagram of a second ground trace of at least one embodiment of the present disclosure.
FIG. 22 is a partial cross-sectional schematic diagram along a V-V' direction in FIG. 21.

FIG. 21 is another schematic diagram of a second ground trace of at least one embodiment of the present disclosure. FIG. 22 is a partial cross-sectional schematic diagram along a V-V' direction in FIG. 21. In some exemplary implemen-tation modes, as shown in FIGS. 21 and 22, the second ground trace 332 may include an inner ring trace 3321, an outer ring trace 3322, and a connection trace 3323. An auxiliary ground trace 335 is provided on a side of the inner ring trace 3321 close to the base substrate 30. The auxiliary ground trace 335 may be of a structure of a same layer as the first touch conductive layer. The first touch insulating layer 301 may not cover or cover a portion of the auxiliary ground trace 335, so that the auxiliary ground trace 335 not covered by the first touch insulating layer 301 directly contacts the inner ring trace 3321. In this example, by providing the auxiliary ground trace 335 on a side of the inner ring trace 3321 on which the aperture is provided close to the base substrate 30, an induced electric field can be prevented from being formed downward from the position of the aperture of the inner ring trace by the charges generated by the friction of the cover plate, the formation of the induced electric field can be effectively prevented, and the transfer of the charges of the cover plate to the inside of the display panel can be more effectively blocked. The rest of the structure of the second ground trace of this embodiment can refer to the description of the aforementioned embodiment, so it will not be described in detail again.

Figures 23, 24:
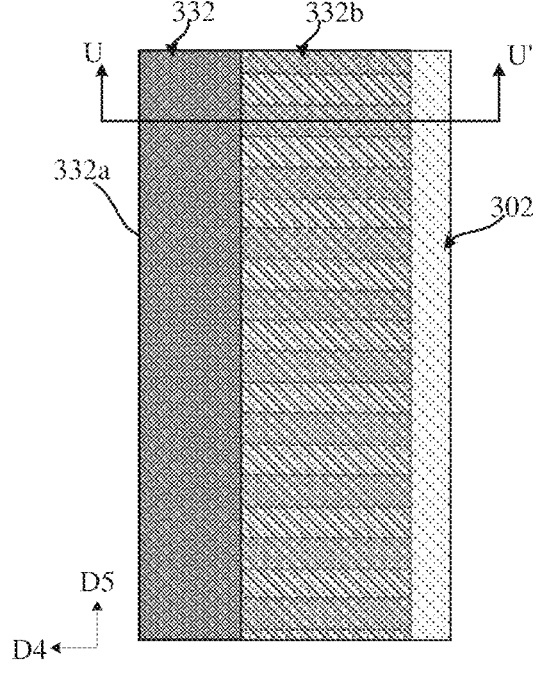
FIG. 23 is another schematic diagram of a second ground trace of at least one embodiment of the present disclosure.
FIG. 24 is a partial sectional view along a U-U' direction in FIG. 23.

FIG. 23 is another schematic diagram of a second ground trace of at least one embodiment of the present disclosure. FIG. 24 is a partial sectional view along a U-U' direction in FIG. 23. In some exemplary implementation modes, as shown in FIGS. 23 and 24, the second ground trace 332 may include a main body 332a and a serrated portion 332b. An auxiliary ground trace 335 is located on a side of the serrated portion 332b close to the base substrate 30. The auxiliary ground trace 335 may be of a structure of a same layer as the first touch conductive layer. The first touch insulating layer 301 may not cover or cover a portion of the auxiliary ground trace 335 so that the auxiliary ground trace 335 not covered by the first touch insulating layer 301 directly contacts the serrated portion 332b of the second ground trace 332. In this example, by forming the serrated portion 332b in the second ground trace 332, the direct contact area between the second ground trace 332 and the second touch insulating layer 302 can be reduced and the problem of peeling of the film layer can be prevented. Moreover, the auxiliary ground trace can prevent the charges generated by the friction of the cover plate from forming an induced electric field downward from the spaced position of the convex strips of the serrated portion, the formation of the induced electric field can be effectively prevented, and the transfer of the charges of the cover plate to the inside of the display panel can be more effectively blocked. The remaining structure of the second ground trace of this embodiment can be described with reference to the foregoing embodiments, so that they will not be described.

The structures shown in the above embodiments can be appropriately combined. For example, an auxiliary ground trace may be provided on a side of the inner ring trace of the second ground trace shown in FIG. 11 close to the base substrate. However, this embodiment is not limited thereto.

The display panel provided by the above implementation modes can effectively lead out the induced charges gener-ated by the friction on the surface of the cover plate, and can effectively block and alleviate the influence of the charges introduction on the internal circuit of the display panel during the external ESD test. Moreover, the above imple-mentation modes save materials and preparation costs.

Figure 25:
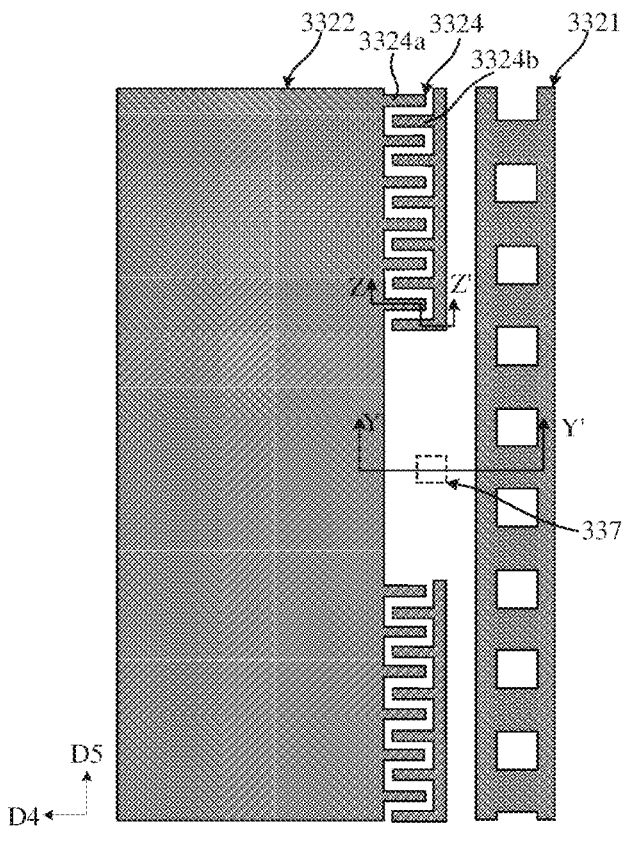
FIG. 25 is another schematic diagram of a second ground trace of at least one embodiment of the present disclosure.
Figure 26:
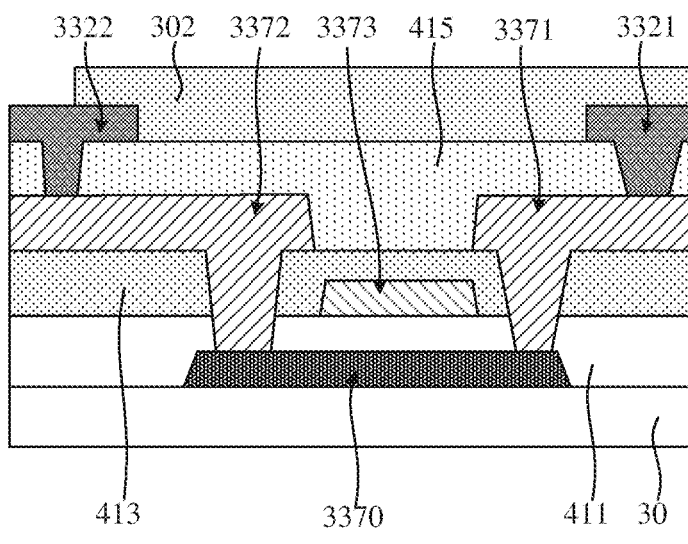
FIG. 26 is a schematic partial sectional view along Y-Y' in FIG. 25.

FIG. 25 is another schematic diagram of a second ground trace of at least one embodiment of the present disclosure. FIG. 26 is a schematic partial sectional view along Y-Y' in FIG. 25. In some exemplary implementation modes, as shown in FIGS. 25 and 26, the second ground trace 332 may include an outer ring trace 3322 and an inner ring trace 3321. A plurality of transistors 337 are disposed between the outer ring trace 3322 and the inner ring trace 3321, and the arrangement positions of the plurality of transistors 337 may be similar to the arrangement positions of the connection traces, so that they are not described herein. In some examples, the transistors 337 may be P-type transistors. However, this embodiment is not limited thereto.

In this example, as shown in FIG. 26, each transistor 337 is connected to the inner ring trace 3321 and the outer ring trace 3322. A single transistor 337 may include an active layer 3370, a gate electrode 3373, a first electrode 3371 and a second electrode 3372. The active layer 3370 of the transistor 337 may be of a structure of a same layer as the semiconductor layer of the drive circuit layer, the gate electrode 3373 may be of a structure of a same layer as the first gate metal layer of the drive circuit layer, and the first electrode 3371 and the second electrode 3372 may be of a structure of a same layer as the first source-drain metal layer of the drive circuit layer. The gate electrode 3373 of the transistor 337 may be disposed on an insulating layer 411 covering the active layer 3370, and the first electrode 3371 and the second electrode 3372 may be disposed on a third insulating layer 413 covering the gate electrode 3373. The first electrode 3371 of the transistor 337 may be electrically connected to the inner ring trace 3321 through a via on the first planarization layer 415, and the second electrode 3372 may be electrically connected to the outer ring trace 3322 through a via on the first planarization layer 415. For example, the first electrode 3371 may be a source electrode of the transistor 337 and the second electrode 3372 may be a drain electrode of the transistor 337. The gate electrode 3373 of the transistor 337 may be electrically connected to a first power supply line VGL. The first power supply line VGL may be a low-potential power supply line to which the gate drive circuit is electrically connected. This embodiment is not limited as to how the first power supply line VGL and the gate electrode 3373 are connected, for example, if the first power supply line VGL is located in the first source-drain metal layer of the drive circuit layer, the first power supply line VGL and the gate electrode 3373 may be electrically connected through the connection electrode; alternatively, the first power supply line VGL and the gate electrode 3373 may be of a structure of a same layer, for example, both may be of an integral structure.

In this example, a transistor is connected between the outer ring trace and the inner ring trace. The transistor can effectively lead out the induced charges generated inside the display panel to the outer ring trace through the inner ring trace, and can prevent the charge during the external ESD test from entering the inside from the outside.

Figures 27A, 27B, 27C:
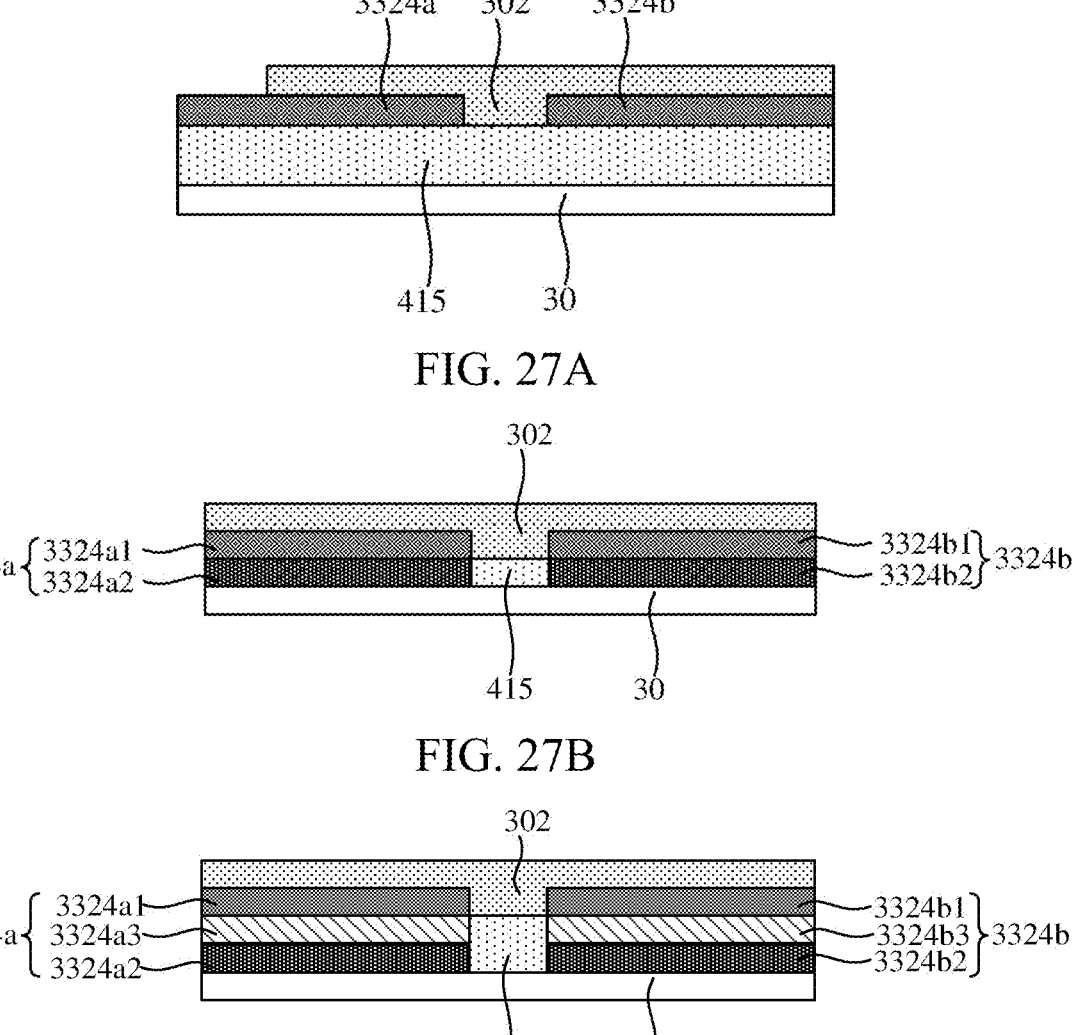
FIG. 27A is a partial sectional view along a Z-Z' direction in FIG. 25.
FIG. 27B is another partial cross-sectional schematic diagram along the Z-Z' direction in FIG. 25.
FIG. 27C is another partial cross-sectional schematic diagram along the Z-Z' direction in FIG. 25.

FIG. 27A is a partial sectional view along a Z-Z' direction in FIG. 25. In some exemplary implementation modes, as shown in FIGS. 25 and 27A, a plurality of anti-static capacitors 3324 are disposed between the inner ring trace 3321 and the outer ring trace 3322. The anti-static capacitor 3324 includes a first plate 3324a and a second plate 3324b. The first plate 3324a and the second plate 3324b may be of a single-layer structure, e.g. is of a structure of a same layer as the second touch conductive layer. The structure of the anti-static capacitor 3324 may be described with reference to the embodiment corresponding to FIG. 11, and therefore will not be described herein.

FIG. 27B is another partial cross-sectional schematic diagram along the Z-Z' direction in FIG. 25. In some exemplary implementation modes, as shown in FIG. 27B, the first plate 3324a of the anti-static capacitor 3324 may include a first sub-plate 3324a1 and a second sub-plate 3324a2 that are stacked, and the second plate 3324b may include a fourth sub-plate 3324b1 and a fifth sub-plate 3324b2 that are stacked. The first sub-plate 3324a1 and the second sub-plate 3324a2 are in direct contact, and the fourth sub-plate 3324b1 and the fifth sub-plate 3324b2 are in direct contact. For example, the orthographic projections of the first sub-plate 3324a and the second sub-plate 3324a2 on the base substrate 30 may coincide, and the orthographic projections of the fourth sub-plate 3324b1 and the fifth sub-plate 3324b2 on the base substrate 30 may coincide. The first sub-plate 3324a1 and the fourth sub-plate 3324b1 may be of a structure of a same layer as the second touch conductive layer, and the second sub-plate 3324a2 and the fifth sub-plate 3324b2 may be of a structure of a same layer as the semiconductor layer of the drive circuit layer. In this example, the first plate 3324a and the second plate 3324b of the anti-static capacitor 3324 are both in a double layer structure.

FIG. 27C is another partial cross-sectional schematic diagram along the Z-Z' direction in FIG. 25. In some exemplary implementation modes, as shown in FIG. 27C, the first plate 3324a of the anti-static capacitor 3324 may include a first sub-plate 3324a1, a third sub-plate 3324a3, and a second sub-plate 3324a2 that are stacked, and the second plate 3324b may include a fourth sub-plate 3324b1, a sixth sub-plate 3324b3, and a fifth sub-plate 3324b2 that are stacked. For example, the orthographic projections of the first sub-plate 3324a1, the second sub-plate 3324a2, and the third sub-plate 3324a3 on the base substrate 30 may coincide, and the orthographic projections of the fourth sub-plate 3324b1, the fifth sub-plate 3324b2, and the sixth sub-plate 3324b3 on the base substrate 30 may coincide. The first sub-plate 3324a1 and the fourth sub-plate 3324b1 may be of a structure of a same layer as the second touch conductive layer, the third sub-plate 3324a3 and the sixth sub-plate 3324b3 may be of a structure of a same layer as the first gate metal layer of the drive circuit layer, and the second sub-plate 3324a2 and the fifth sub-plate 3324b2 may be of a structure of a same layer as the semiconductor layer of the drive circuit layer. In this example, both the first plate 3324a and the second plate 3324b of the anti-static capacitor 3324 have a three-layer structure. However, this embodiment is not limited thereto. In some other examples, a sub-plate of a capacitor plate may also be provided in the first touch conductive layer.

In this example, by designing the two plates of the anti-static capacitor as a multi-layer structure, the thickness of the plates can be increased to increase the capacitance and improve a risk of electrostatic breakdown.

Figure 28:
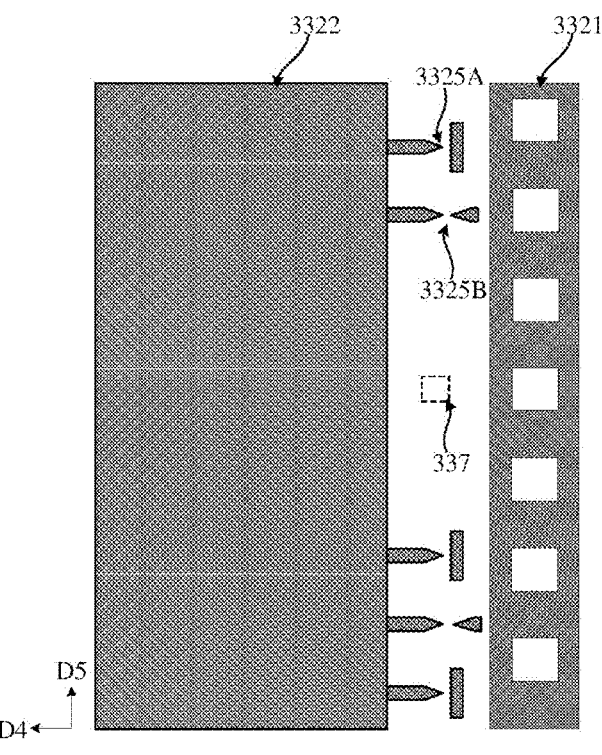
FIG. 28 is another schematic diagram of a second ground trace of at least one embodiment of the present disclosure.

FIG. 28 is another schematic diagram of a second ground trace of at least one embodiment of the present disclosure. In some exemplary implementation modes, as shown in FIG. 28, the second ground trace 332 may include an outer ring trace 3322 and an inner ring trace 3321. A transistor 337 and a tip discharge structure (including, for example, a first tip discharge structure 3325A and a second tip discharge structure 3325B) are provided between the inner ring trace 3321 and the outer ring trace 3322. The structure of the transistor 337 in this example may refer to the embodiment shown in FIG. 25 and the description of the tip discharge structure may refer to the embodiment shown in FIG. 16, so that the description will not be repeated here.

In this example, the induced charges generated inside the display panel can be grounded and led out from the outer ring trace through the inner ring trace and the transistor, and the external static electricity during ESD test can be grounded and released through the outer ring trace, and can also be discharged through the tip discharge structure.

Figure 29:
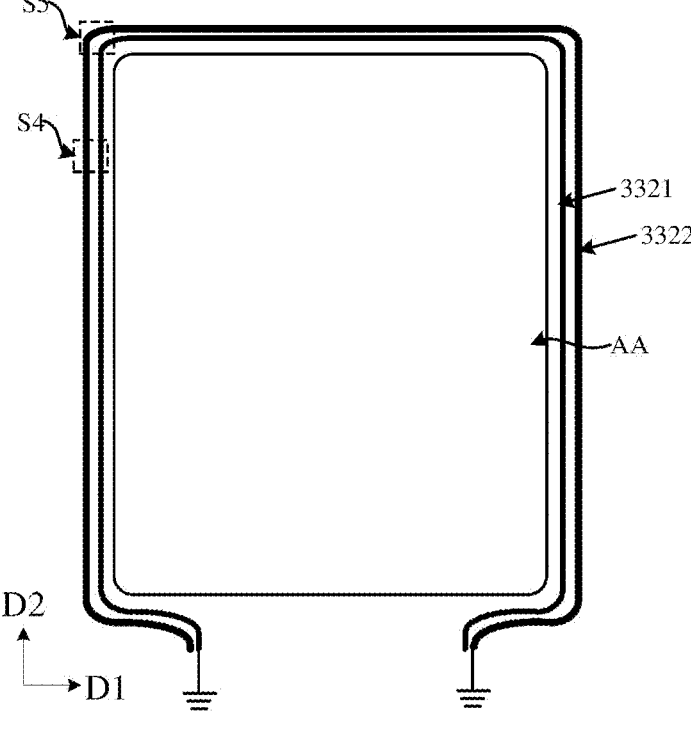
FIG. 29 is another schematic diagram of a second ground trace according to at least one embodiment of the present disclosure.

FIG. 29 is another schematic diagram of a second ground trace according to at least one embodiment of the present disclosure. In some exemplary implementation modes, as shown in FIG. 29, the second ground trace located in the edge area may include an inner ring trace 3321 and an outer ring trace 3322. The inner ring trace 3321 and outer ring trace 3322 are separately grounded. For example, the bonding pin area 206 of the bonding area may include a plurality of independent ground pins. The inner ring trace 3321 extends to the bonding pin area 206 and is electrically connected to one of the ground pins for example, in an integral structure. The outer ring trace 3322 extends to the bonding pin area 206 and is electrically connected to the other ground pin therein, for example, in an integral structure. In some examples, the first ground trace may be electrically connected to a separate ground pin in the bonding pin area, i.e. the first ground trace may not be electrically connected to either the inner ring trace or the outer ring trace; alternatively, the first ground trace can be connected to a same ground pin as the inner ring trace in the bonding pin area; alternatively, the first ground trace may be connected to a same ground pin as the outer ring trace in the bonding pin area. However, this embodiment is not limited thereto.

In some examples, two ends of the inner ring trace 3321 may both extend to the bonding pin area and be electrically connected to ground pins, respectively, or one end of the inner ring trace 3321 may extend to the bonding pin area and be connected to the ground pin. Two ends of the outer ring trace 3322 may both extend to the bonding pin area and be electrically connected to ground pins, respectively, or one end of the outer ring trace 3322 may extend to the bonding pin area and be connected to the ground pin. However, this embodiment is not limited thereto.

In this example, by completely isolating the inner ring trace and the outer ring trace of the second ground trace to form a moat, induced charges generated inside the display panel are grounded and discharged through the inner ring trace, and external static electricity can be grounded and released through the outer ring trace.

Figure 30:
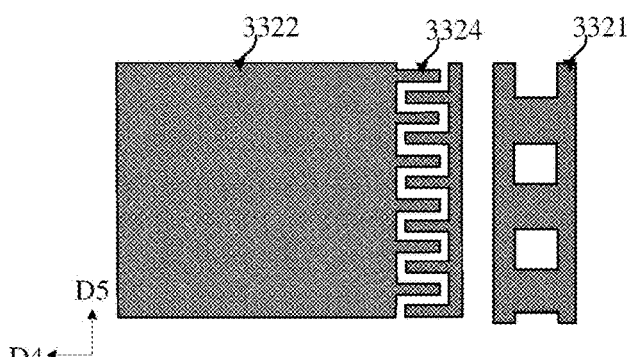
FIG. 30 is a schematic partial enlarged diagram of an area S4 in FIG. 29.

FIG. 30 is a schematic partial enlarged diagram of an area S4 in FIG. 29. In the area S4, the first direction D1 may be parallel to the fourth direction D4, and the second direction D2 may be parallel to the fifth direction D5. In some exemplary implementation modes, as shown in FIG. 30, the second ground trace may include an outer ring trace 3322 and an inner ring trace 3321, and an anti-static capacitor 3324 may be disposed between the inner ring trace 3321 and the outer ring trace 3322. The structure of the anti-static capacitor 3324 can be described with reference to the foregoing embodiment and therefore will not be described here.

In this example, by completely isolating the inner ring trace and the outer ring trace of the second ground trace to form a moat, the induced charges generated inside the display panel is grounded and discharged through the inner ring trace, and external static electricity can be shunted by both ground release through the outer ring alignment and dissipation through the anti-static capacitor.

Figure 31:
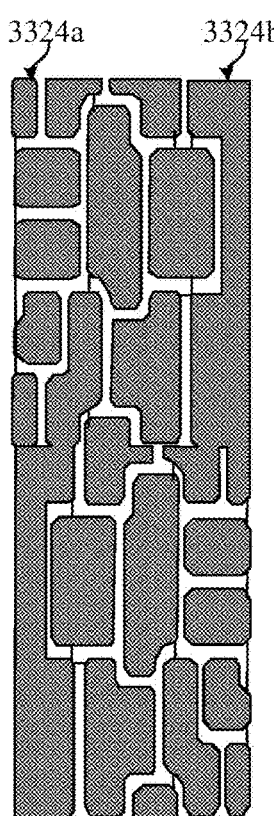
FIG. 31 is a schematic partial enlarged diagram of an area S5 in FIG. 29.

FIG. 31 is a schematic partial enlarged diagram of an area S5 in FIG. 29. In some exemplary implementation modes, as shown in FIG. 31, the first plate 3324*a* and the second plate 3324*b* of the anti-static capacitor 3324 may be arranged in an irregular shape at a corner position or an edge position of the edge area, for example, the orthographic projections of the first plate 3324*a* and the second plate 3324*b* on the base substrate may be of a mosaic pattern. By providing the anti-static capacitor 3324 with a first plate and a second plate in an irregular shape, a reasonable arrangement of the anti-static capacitor in irregular areas can be realized. However, this embodiment is not limited thereto. In some other examples, the orthographic projections of both the first plate and the second plate of the anti-static capacitor of the edge area on the base substrate may be in a mosaic pattern. The anti-static capacitor provided in this example can be used to dissipate external static electricity.

The structures shown in the above implementation modes can be appropriately combined. For example, the second ground trace may include an outer ring trace and an inner ring trace separately grounded, and a plurality of tip discharge structures may be provided between the outer ring trace and the inner ring trace. However, this embodiment is not limited thereto.

Figure 32:
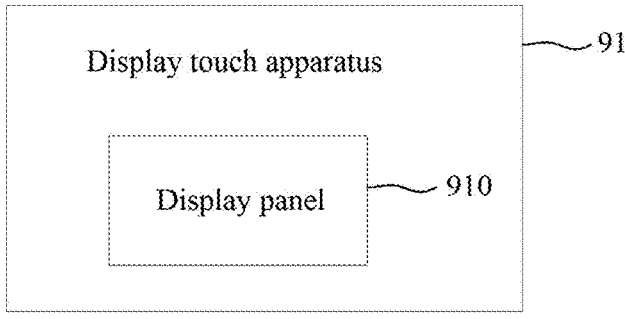
FIG. 32 is a schematic diagram of a display touch apparatus according to at least one embodiment of the present disclosure.

FIG. 32 is a schematic diagram of a display touch apparatus according to at least one embodiment of the present disclosure. As shown in FIG. 32, this embodiment provides a display touch apparatus 91 including a display panel 910 of the aforementioned embodiments. In some examples, the display panel 910 may be an OLED display panel with an integrated touch structure. The display touch apparatus 91 may be: any product or component with a display and touch function, such as a mobile phone, a tablet computer, a television, a display, a laptop, a digital photo frame, or a navigator. In some exemplary implementation modes, the display touch apparatus 91 may be a wearable display apparatus, for example, which may be worn on a human body in some manners. For example, the display touch apparatus 91 may be a smart watch, a smart bracelet, and the like. However, this embodiment is not limited thereto.

The drawings of the present disclosure only involve structures involved in the present disclosure, and other structures may be referred to conventional designs. The embodiments of the present disclosure and features in the embodiments may be combined with each other to obtain new embodiments if there is no conflict.

Those of ordinary skills in the art should understand that modifications or equivalent replacements may be made on the technical solutions of the present disclosure without departing from the spirit and scope of the technical solutions of the present disclosure, and shall all fall within the scope of the claims of the present disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A display panel comprising: an active area, a peripheral area located at a periphery of the active area; wherein the active area comprises a base substrate, a display structure layer and a touch structure layer arranged sequentially on the base substrate;

the peripheral area comprises an isolation dam, a first ground trace and a second ground trace arranged on the base substrate; and the first ground trace is located on a side of the isolation dam close to the active area, and the second ground trace is located on a side of the isolation dam away from the active area;

wherein the touch structure layer comprises: a first touch conductive layer, a first touch insulating layer, a second touch conductive layer, and a second touch insulating layer arranged sequentially on the display structure layer; and the first ground trace and the second ground trace are of a structure of a same layer as the second touch conductive layer; and wherein the peripheral area further comprises: an auxiliary ground trace;

the auxiliary ground trace and the first touch conductive layer are of a structure of a same layer; and the auxiliary ground trace is connected to the second ground trace, and an orthographic projection of the auxiliary ground trace on the base substrate partially overlaps an orthographic projection of the second ground trace on the base substrate.

2. The display panel according to claim 1, wherein the second ground trace comprises: an outer ring trace and an inner ring trace; the outer ring trace is located on a side of the inner ring trace away from the active area.

3. The display panel according to claim 2, wherein the inner ring trace is provided with a plurality of apertures arranged in at least one column along the direction of the active area toward the edge area.

4. The display panel according to claim 3, wherein the plurality of apertures provided in the inner ring trace are arranged in a column along the direction of the active area toward the edge area, and an orthographic projection of the plurality of apertures on the base substrate does not overlap an orthographic projection of a conductive layer located in the peripheral area and being of a structure of a same layer as the display structure layer on the base substrate.

5. The display panel according to claim 2, wherein the second ground trace further comprises a plurality of connection traces connected between the outer ring trace and the inner ring trace.

6. The display panel according to claim 5, wherein an orthographic projection of at least one of the plurality of connection traces on the base substrate is rectangular.

7. The display panel according to claim 5, wherein an orthographic projection of at least one of the plurality of connection traces on the base substrate is s-shaped.

8. The display panel according to claim 7, wherein
a single connection trace comprises a first extension segment and a second extension segment which are connected sequentially, the first extension segment extends in a direction of the active area toward the edge area, the extension direction of the second extension segment intersects the extension direction of the first extension segment; and
the first extension segment, the second extension segment and the first extension segment which are connected sequentially form a circuity, or the second extension segment, the first extension segment and the second extension segment sequentially connected form a circuity.

9. The display panel according to claim 8, wherein
the number of circuities of a single connection trace is 3 to 5; the width of the first extension segment and the second extension segment is 3 microns to 5 microns, and the spacing between adjacent extension segments extending in the same direction is 3 microns to 5 microns.

10. The display panel according to claim 2, wherein a plurality of tip discharge structures are provided between the outer ring trace and the inner ring trace, and at least one tip discharge structure comprises: a first electrode and a second electrode, the first electrode and the outer ring trace are of an integral structure, the second electrode is located between the first electrode and the inner ring trace; the first electrode has a first tip, the first tip of the first electrode faces the second electrode, and there is a gap between the first tip and the second electrode.

11. The display panel according to claim 10, wherein the second electrode has a second tip; the second tip of the second electrode faces the first tip of the first electrode, and there is a gap between the first tip and the second tip.

12. The display panel according to claim 10, wherein an orthographic projection of the second electrode on the base substrate is rectangular.

13. The display panel according to claim 2, wherein a plurality of anti-static capacitors are disposed between the outer ring trace and the inner ring trace, at least one anti-static capacitor comprises a first plate and a second plate; the first plate and the outer ring trace are of an integral structure, and the second plate is located at a side of the first plate close to the inner ring trace.

14. The display panel according to claim 13, wherein the first plate has a plurality of first comb portions facing the second plate, the second plate has a plurality of second comb portions facing the first plate, the plurality of first comb portions and the plurality of second comb portions interspersed with each other,
wherein the first plate of the anti-static capacitor is grounded and the second plate is a dummy conductive structure.

15. The display panel according to claim 14, wherein a spacing between adjacent first comb portion and second comb portion, a width of the first comb portion and a width of the second comb portion are substantially the same.

16. The display panel of claim 2, wherein the peripheral area further comprises: a crack dam located on a side of the isolation dam away from the active area;
the outer ring trace is located on a side of the crack dam away from the active area, and an orthographic projection of the outer ring trace on the base substrate does not overlap an orthographic projection of the crack dam on the base substrate,
wherein the width ratio of the outer ring trace to the inner ring trace is 2.7 to 3.3.

17. The display panel according to claim 2, wherein the peripheral area further comprises: a plurality of auxiliary electrodes located on a side of the inner ring trace close to the base substrate, an insulating layer is disposed between the plurality of auxiliary electrodes and the inner ring trace, and an orthographic projection of the inner ring trace on the base substrate covers an orthographic projection of the plurality of auxiliary electrodes on the base substrate,
wherein the inner ring trace is provided with a plurality of apertures, and the orthographic projection of the plurality of auxiliary electrodes on the base substrate are arranged between an orthographic projection of the plurality of apertures on the base substrate.

18. The display panel according to claim 17, wherein the plurality of apertures are arranged in a column along the direction of the active area toward the edge area, and an auxiliary electrode is arranged at intervals of two apertures,
wherein the length of the auxiliary electrode in a fourth direction is greater than the length of the aperture in the fourth direction, and the length of the auxiliary electrode in a fifth direction is less than the length of the aperture in the fifth direction; the fourth direction is the direction in which the active area faces the edge area, and the fifth direction intersects with the fourth direction.

19. The display panel according to claim 17, wherein the plurality of auxiliary electrodes are dummy conductive structures, and the orthographic projection of the auxiliary electrodes on the base substrate is rectangular,
wherein an orthographic projection of the outer ring trace on the base substrate does not overlap an orthographic projection of the second touch insulating layer on the base substrate.

20. A display apparatus comprising a display panel according to claim 1.

* * * * *